(12) United States Patent
Lopatecki et al.

(10) Patent No.: US 10,911,821 B2
(45) Date of Patent: Feb. 2, 2021

(54) UTILIZING COMBINED OUTPUTS OF A PLURALITY OF RECURRENT NEURAL NETWORKS TO GENERATE MEDIA CONSUMPTION PREDICTIONS

(71) Applicant: Adobe Inc., San Jose, CA (US)

(72) Inventors: Jason Lopatecki, Mill Valley, CA (US); Julie Lee, Danville, CA (US)

(73) Assignee: ADOBE INC., San Jose, CA (US)

( * ) Notice: Subject to any disclaimer, the term of this patent is extended or adjusted under 35 U.S.C. 154(b) by 167 days.

(21) Appl. No.: 16/144,724

(22) Filed: Sep. 27, 2018

(65) Prior Publication Data
US 2020/0107070 A1 Apr. 2, 2020

(51) Int. Cl.
H04N 21/442 (2011.01)
G06N 3/04 (2006.01)
G06N 3/08 (2006.01)
H04N 21/466 (2011.01)

(52) U.S. Cl.
CPC ..... *H04N 21/44204* (2013.01); *G06N 3/0454* (2013.01); *G06N 3/08* (2013.01); *H04N 21/4666* (2013.01)

(58) Field of Classification Search
CPC ......... H04N 21/44204; H04N 21/4666; G06N 3/0454; G06N 3/08; G06N 3/02; G06N 3/04
See application file for complete search history.

(56) References Cited

U.S. PATENT DOCUMENTS

| 8,627,359 B2 | 1/2014 | Kitts et al. | |
| 2003/0182249 A1* | 9/2003 | Buczak | H04N 7/16 706/15 |
| 2015/0178265 A1* | 6/2015 | Anderson | G06F 40/274 704/9 |
| 2019/0012441 A1* | 1/2019 | Tuli | G06N 3/08 |

OTHER PUBLICATIONS

Understanding LSTM Networks—colah's blog, Aug. 27, 2015 (Year: 2015).*

* cited by examiner

*Primary Examiner* — Benjamin R Bruckart
*Assistant Examiner* — Tien M Nguyen
(74) *Attorney, Agent, or Firm* — Keller Jolley Preece

(57) ABSTRACT

Methods, systems, and non-transitory computer readable storage media are disclosed for utilizing a plurality of recurrent neural networks to generate media consumption predictions and providing media content to a target audience. For example, the disclosed system can train a plurality of long short-term memory neural networks for a plurality of users based on historical media consumption data over a plurality of time periods. In one or more embodiments, the disclosed system identifies a target audience including a subset of users and the corresponding neural networks. The disclosed system can then utilize the neural networks of the subset of users to generate a plurality of predictions for a future time period for the users. In some embodiments, the disclosed system then combines the predictions for the users to generate a media consumption prediction for the target audience for the future time period.

20 Claims, 12 Drawing Sheets

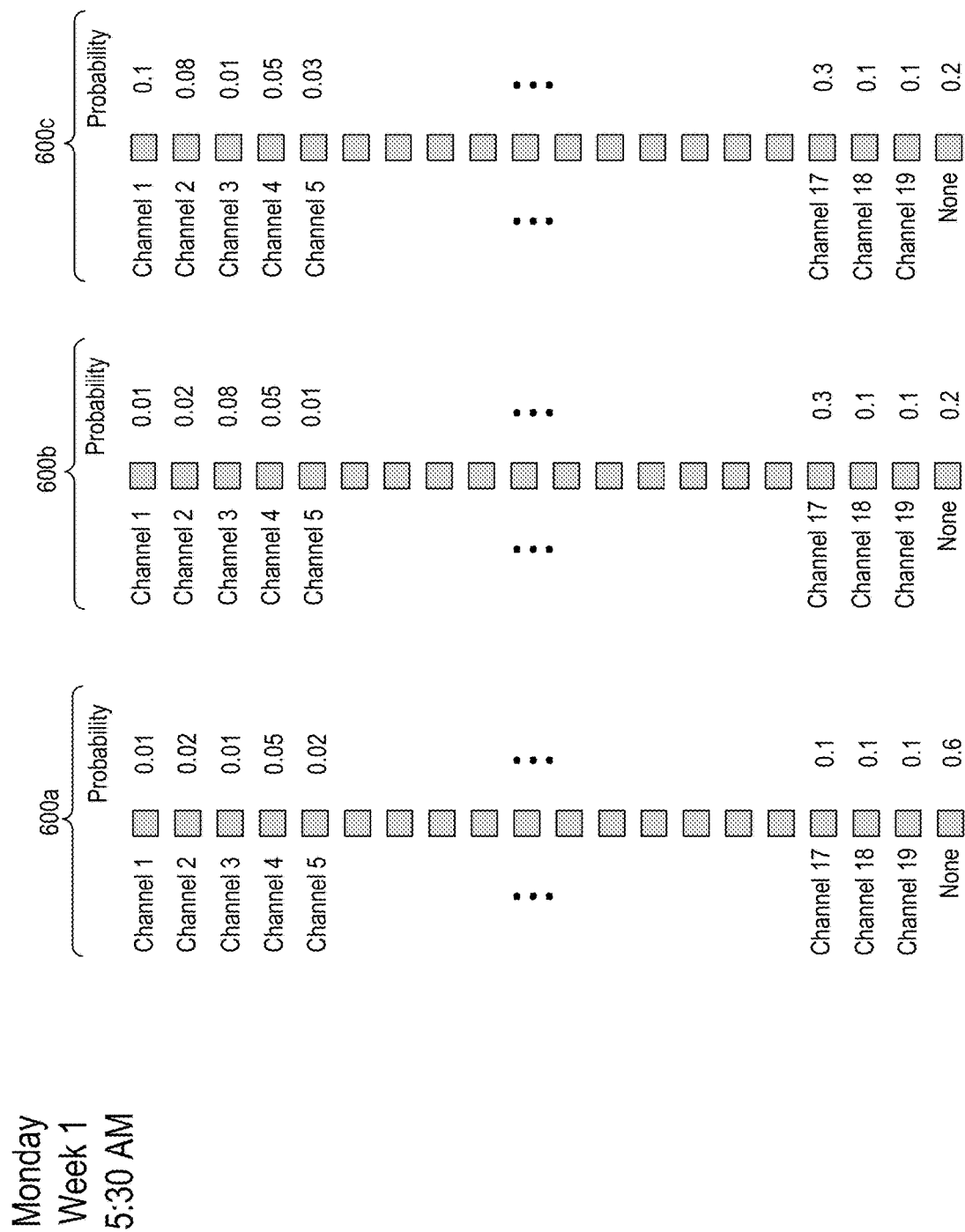

US 10,911,821 B2

UTILIZING COMBINED OUTPUTS OF A PLURALITY OF RECURRENT NEURAL NETWORKS TO GENERATE MEDIA CONSUMPTION PREDICTIONS

BACKGROUND

Recent years have seen significant improvement in hardware and software platforms for generating and providing media content across computing devices. Indeed, conventional media generation and distribution systems (e.g., computing systems for creating, selecting and/or distributing television or radio content) can now collect and analyze digital media consumption data by population segment to quickly and automatically determine media content to generate and/or provide across various devices. For example, conventional media generation and distribution computing systems can analyze media consumption data and generate predictions for media content to generate or provide to target audiences via various channels.

Although conventional media generation and distribution computing systems can create, select, and distribute content, they still have a number of technological problems in relation to targeting recipients (e.g., consumers) with accuracy, flexibility, and efficiency. For example, conventional systems often generate inaccurate predictions of how, when, and where to reach specific consumers with content (e.g., advertisements) they consume. For instance, some conventional systems utilize small aggregated panel data (e.g., from third-party consumer panels) and fixed audience groups to generate predictions in relation to various channels or target audiences. Thus, although conventional systems can generate predictions, they are often inaccurate for groups of target audiences of smaller group sizes, panels with larger sample sizes, or audiences/users that have characteristics that do not match the average of the aggregated panel data. Furthermore, many conventional systems utilize rule-based models that fail to accurately account for sequential trends in data over time for various different users.

In addition, conventional systems are also rigid and inflexible. Indeed, as just discussed, because of their architecture and structure, some conventional systems are rigidly tied to generating predictions in relation to a very specific, small set of target audiences or distribution channels (e.g., aggregated panel data sets analyzed by an overarching complex model). Such conventional systems are thus inflexible and inaccurate in dynamically generating media content or predictions for a wide variety of target audiences, channels, or time slots.

In addition to accuracy and flexibility, conventional systems also have shortcomings with regard to speed and efficiency. For example, many conventional media generation and distribution systems utilize a single complex, time-consuming model to generate predictions for the content to target based on target audiences. Such a prediction model requires significant computing resources to train and utilize and also requires significant time to operate in generating predictions or in selecting media content to provide to client devices.

SUMMARY

One or more embodiments provide benefits and/or solve one or more of the foregoing or other problems in the art with systems, methods, and non-transitory computer readable storage media that utilize combined outputs of a plurality of recurrent neural networks to generate dynamic, granular media consumption predictions and/or to provide media content. For example, in one or more embodiments, the disclosed systems train a plurality of recurrent neural networks (e.g., long short-term memory neural networks) based on historical media consumption data for a plurality of users. In particular, the disclosed systems can train each neural network based on historical media consumption for a single user (or a small group of users), thereby training a large number of neural networks for users with known characteristics. Furthermore, the disclosed systems can utilize a subset of the trained neural networks to generate aggregate media consumption predictions for any arbitrary group of target audiences. Specifically, in one or more embodiments, the disclosed systems select a subset of trained neural networks (e.g., by matching a target audience with user characteristics corresponding to trained networks) and playing forward the subset of trained neural networks for a set of future time periods. The disclosed systems can thus efficiently, flexibly, and accurately generate media consumption predictions and/or select media content or advertisements to provide to a variety of target audiences using a plurality of neural networks trained using media consumption data for a plurality of users within the target audiences.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 6A-6C illustrate diagrams of media consumption predictions for users in accordance with one or more embodiments;

DETAILED DESCRIPTION

Figure 1:
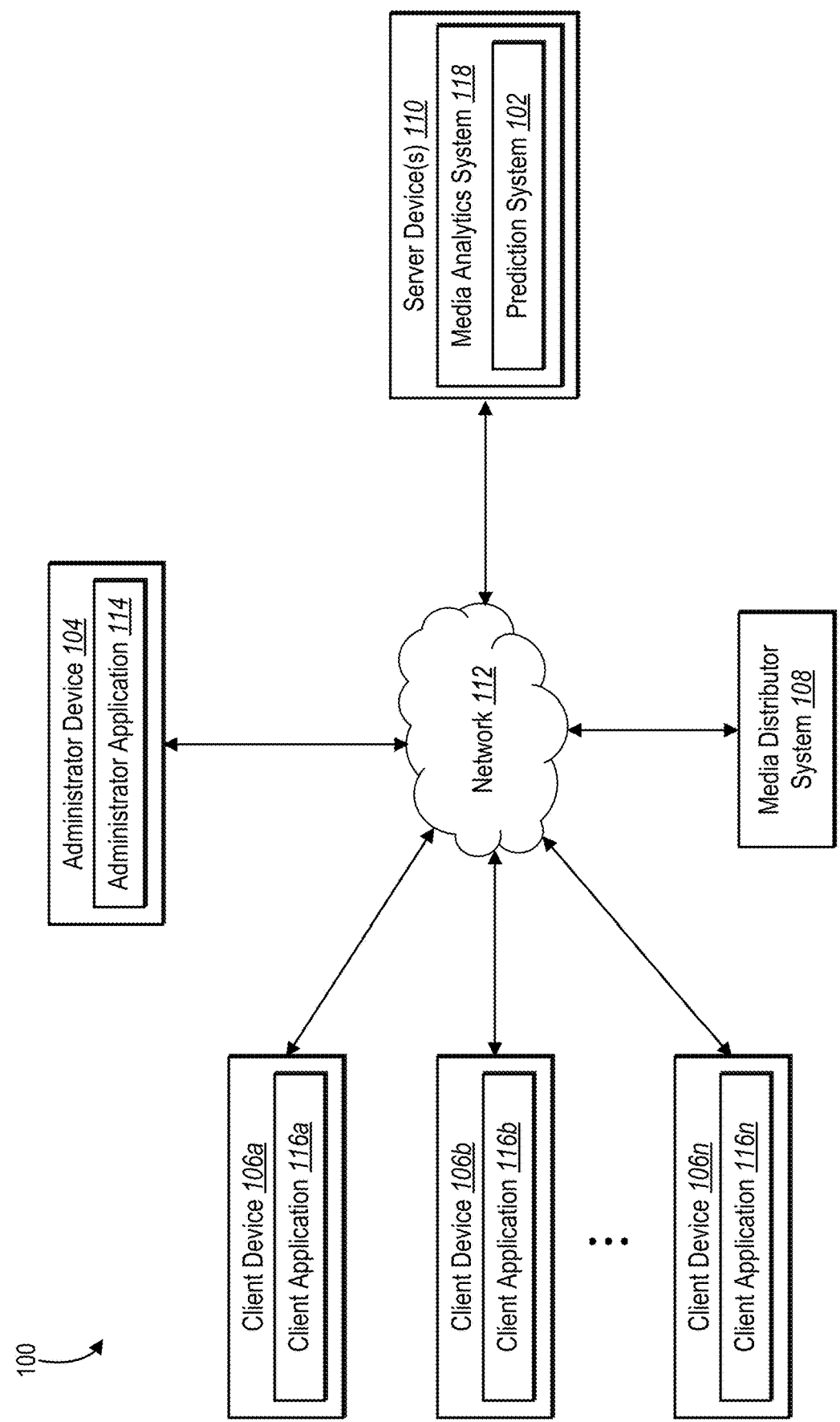
FIG. 1 illustrates an example environment in which a multi-RNN prediction system can operate in accordance with one or more implementations.

One or more embodiments of the present disclosure include a multi-RNN prediction system that utilizes combined outputs of a plurality of recurrent neural networks to generate media consumption predictions and provide media content to target audiences. For example, the multi-RNN prediction system can train a plurality of long short-term memory neural networks for a plurality of users based on media consumption sequences of the users. In particular, in one or more embodiments the multi-RNN prediction system trains a long short-term memory neural network for each user (or for groups of 2 or 3 users) using historic media consumption for those users. The multi-RNN prediction system can then utilize neural networks of a subset of users that correspond to a given target audience to generate a plurality of media consumption predictions. Furthermore, in some embodiments the multi-RNN prediction system combines the individual media consumption predictions to generate a media consumption prediction for a selected subset of an audience representing the target group of the audience. By using a plurality of neural networks trained for unique users (or small groups of users), the multi-RNN prediction system can efficiently, accurately, and flexibly generate media consumption predictions to aid in selecting and providing media content for any number of arbitrary target audiences.

As mentioned, the multi-RNN prediction system can generate media consumption predictions for a target audience using a plurality of long short-term memory (or "LSTM") neural networks. In one or more embodiments, the multi-RNN prediction system trains the LSTM neural networks using historical media consumption data for a plurality of users. Specifically, the media consumption data can include sequences of historical media consumption data for sequential time slots over a predetermined amount of time. The multi-RNN prediction system trains each LSTM neural network to recognize media consumption patterns, trends, habits, and preferences of a unique individual user from the sequences of historical media consumption data of the corresponding user.

In one or more embodiments, the multi-RNN prediction system can train each LSTM neural network to recognize media consumption patterns, trends, habits, and preferences of unique, but small, groups of users. In particular, the multi-RNN prediction system can use historical media consumption for two or three users (or other small number of users) to train an LSTM neural network. Training a plurality of LSTM neural networks on small groups of users (instead of just individual users) according to available resources allows the multi-RNN prediction system to scale for larger target audiences by reducing the number of LSTM neural networks to maintain.

After training a plurality of LSTM neural networks for a plurality of users, the multi-RNN prediction system can use subsets of the trained LSTM neural networks to generate predictions for target audiences. In particular, in one or more embodiments, the multi-RNN prediction system identifies a target audience including a plurality of users having one or more shared characteristics. For instance, the multi-RNN prediction system can identify the target audience in response to a user/administrator selection of a target audience characteristics that create a target group. In one or more embodiments, the multi-RNN prediction system identifies the subset of trained LSTM neural networks for the users corresponding to the target audience and uses the subset of trained LSTM networks to generate a media consumption prediction for each of the users for one or more media time slots. Using the predictions from the LSTM neural networks, the multi-RNN prediction system can then generate a prediction of media consumption for the target audience as a whole. In some embodiments, the multi-RNN prediction system also generates and/or provides media content based on the media consumption prediction.

Furthermore, the multi-RNN prediction system can perform state updates on the LSTM neural networks in between training periods. In one or more embodiments, the multi-RNN prediction system trains each LSTM neural network at regular intervals by comparing the predictions to ground truth consumption data. For instance, the multi-RNN prediction system can train an LSTM neural network in monthly intervals by modifying parameters of the LSTM neural network based on the difference between the predictions and ground truth media consumption. Additionally, because an LSTM neural network includes short term memory characteristics, the multi-RNN prediction system can perform regular (e.g., daily) updates of the states in the LSTM neural network to capture trend information that occur between training periods. Accordingly, the multi-RNN prediction system can capture short term trends of each user's media consumption without requiring more frequent retraining of the neural networks.

As mentioned the multi-RNN prediction system provides a number of advantages over conventional systems. For example, the multi-RNN prediction system improves the accuracy of computing systems relative to conventional systems. Specifically, the multi-RNN prediction system improves accuracy by training a plurality of recurrent neural networks based on corresponding user's media consumption history. This allows the multi-RNN prediction system to more accurately predict a given user's media consumption because each neural network learns a given user's individual habits and preferences. In turn, the multi-RNN prediction system can more accurately predict media consumption in relation to a target audience of users with similar characteristics.

In addition, the multi-RNN prediction system also improves the flexibility relative to conventional systems. In particular, the multi-RNN prediction system improves flexibility by training separately managed neural networks for users which can be utilized to generate a variety of different predictions for different target audiences. In particular, the multi-RNN prediction system can generate predictions for individual users specific to any variety of different target audiences. The multi-RNN prediction system can then combine the predictions to generate an over-arching prediction for the entire target audience. The separate neural networks provide additional flexibility in generating predictions for a wide variety of target audiences by dynamically combining the neural networks of the users corresponding to a given target audience.

Additionally, the multi-RNN prediction system improves efficiency relative to conventional systems. The multi-RNN prediction system improves efficiency by reducing the time and resources needed to train neural networks to generate media consumption predictions for a target audience that includes a large number of people. In particular, training neural networks for individual users and then grouping the neural networks together to generate combined predictions reduces training times and resources and allows for more flexible training schedules, thereby reducing computing resources required for training time for a given target audience. Furthermore, training a single neural network for a target audience limits the use of that neural network to generate predictions for specific, pertinent target audiences (rather than running a large, time-consuming model for every prediction).

As illustrated by the foregoing discussion, the present disclosure utilizes a variety of terms to describe features and advantages of the multi-RNN prediction system. Additional detail is now provided regarding the meaning of the terms. For example, as used herein, the term "media content" (or "media") refers to information expressed through a communication channel. Media content can include television programs, radio programs, movies (e.g., digital movies), advertisements, or similar media broadcast over television, radio, or video streaming (e.g., Internet) channels. Media content can be broadcast over a variety of television, radio, or video networks/stations/channels.

As used herein, the term "media consumption sequence" refers to media content consumed (e.g., viewed or listened to) by a user in a chronological order. For instance, a media consumption sequence can include a plurality of programs (or other media content) in a plurality of chronologically sequential time slots within a given time period. To illustrate, a media consumption sequence for a given day includes media content consumed (or not consumed) by a user in each media time slot (e.g., every half hour) within a 24-hour period. Accordingly, historical media consumption sequences represent media consumed by a user for a past time period. Furthermore, historical media consumption sequences can filter quickly switching between more than one media content item (e.g., "channel flipping" of less than 2 minutes of viewership) out of the dataset.

Additionally, as used herein, the term "media consumption prediction" refers to a prediction that a user (or a group of users) will view certain media content (e.g., in a specific future time slot). To illustrate, a media consumption prediction can include a prediction that a user will view a specific network/channel during a specific time period. Furthermore, as used herein, the term "ground truth consumption value" refers to media that a user consumes within a given time slot. Thus, a ground truth consumption value can include a program or network that a user consumes within a time period. Accordingly, for each media consumption prediction, the multi-RNN prediction system can obtain a ground truth consumption value after the corresponding time slot/time period passes. Additionally, the multi-RNN prediction system can utilize a ground truth consumption value can to perform additional analysis of the media content consumed by a target audience, such as an on-target percentage (target consumption/total consumption) for a time period.

As used herein, the term "recurrent neural network" refers to an artificial neural network (e.g., a neural network that performs analytical tasks for elements in a sequential order based on computations from previous elements). In particular, a recurrent neural network includes an artificial neural network that uses sequential information associated with media content consumed by a user, and in which an output of a current step is dependent on computations for previous steps. For example, the campaign management system trains and uses a recurrent neural network for a user to predict media consumption of a specific user during a plurality of sequential time slots. Specifically, a trained recurrent neural network sequentially analyzes a user's historical media consumption to determine media the user is likely to view within a given future time period. A recurrent neural network can correspond to a single user or to a small group of users (e.g., two or three users).

Furthermore, as used herein, the terms "long short-term memory neural network" and "LSTM neural network" refer to a type of recurrent neural network capable of learning long-term dependencies in sequential information. Specifically, an LSTM neural network can include a plurality of layers that interact with each other to retain additional information between units of the network in connection with a state for each unit. As used herein, the term "state" (or "cell state") refers to a component of each cell that includes long-term information from previous units of the LSTM neural network. The LSTM neural network can update the cell state for each unit (e.g., during an "update stage") by using the plurality of layers to determine which information to retain and which information to forget from previous units. The state of each unit thus influences the information that is retained from one unit to the next to form long-term dependencies across a plurality of units. Furthermore, the multi-RNN prediction system can perform one or more "training stages" during which the multi-RNN prediction system updates parameters of the LSTN neural network based on historical media consumption data.

As used herein, the term "target audience" refers to a plurality of users that share one or more characteristics. Specifically, a target audience can include a group of users that have a characteristic such as age, gender, geographic location, interest (e.g., based on search/purchase history), or other characteristic that provides an indication of a user demographic. In one or more embodiments, an administrator selects a target audience from a plurality of possible audiences to generate media consumption predictions for the users in the target audience.

Additional detail will now be provided regarding the multi-RNN prediction system in relation to illustrative figures portraying exemplary implementations. To illustrate, FIG. 1 includes an embodiment of an environment 100 in which a multi-RNN prediction system 102 operates. In particular, the environment 100 includes an administrator device 104 associated with an administrator, a plurality of client devices 106a-106n associated with a plurality of users, a media distributor system 108, and server device(s) 110 in communication via a network 112. Moreover, as shown, the administrator device 104 includes an administrator application 114, and the client devices 106a-106n include client applications 116a-116n. Furthermore, the server device(s) 110 include a media analytics system 118, which includes the multi-RNN prediction system 102.

As illustrated, the media distributor system 108 is associated with a media distributor that provides media content to a plurality of users. A media distributor can include an entity that manages media content for a television/radio/Internet network, channel, or station by determining which media content to provide to users during a plurality of time periods. For instance, a media distributor can determine which content to provide by airing media content over one or more communication media to a plurality of users. The media distributor system 108 can include a plurality of computing devices (e.g., servers) that store media content and/or manage media distribution over the network 112 to the client devices 106a-106n.

According to one or more embodiments, the multi-RNN prediction system 102 allows the administrator associated with the administrator device 104 to administrate a media content campaign for determining media content to provide to a plurality of users. For example, the administrator device 104 can include a smartphone, tablet, desktop computer, laptop computer, or other device that is able to access the multi-RNN prediction system 102 via the network 112 and receive information associated with media consumption (e.g., historical media consumption data and media consumption predictions). In one or more embodiments, the administrator device 104 is associated with a marketing entity that purchases time slots from the media distributor for airing advertisements with other media content provided by the media distributor system 108. For instance, the administrator can utilize the information from the multi-RNN prediction system 102 to determine when, and via which network/channel/station, to provide an advertisement by purchasing a time slot (e.g., a 30-minute block of time) or program slot during which to provide an advertisement for reaching the target audience. Alternatively, the administrator device 104 can be associated with the media distributor system 108 for determining when to air specific media content or otherwise determining how to distribute the media content. Furthermore, the administrator device 104 can generate media content (e.g., generate a particular advertisement or show) to provide to a target audience.

As mentioned, the server device(s) 110 include a media analytics system 118. The media analytics system 118 can manage media consumption data for one or more media distributors and provide analysis of media consumption to the media distributors, marketing entities, or other entities. For example, the media analytics system 118 can communicate with the media distributor system 108 to obtain information about media content, including media content distributed during a plurality of time periods.

The media analytics system 118 can also communicate with the client devices 106a-106n to obtain media consumption data for a plurality of corresponding users. To illustrate, the media analytics system 118 can communicate with the client devices 106a-106n to obtain information collected by the client applications 116a-116n in connection with media content that the users consume. In one or more embodiments, the client devices 106a-106n include desktop computers, laptop computers, smartphones, set-top boxes, smart televisions, or other devices capable of reporting media consumption to the media analytics system 118 via the network 112. Accordingly, the client applications 116a-116n can include applications that allow users to consume media or applications that detect media consumption of a user and report the media consumption to the media analytics system 118.

In one or more embodiments, the media analytics system 118 communicates with a third-party system to collect media consumption data from the client devices 106a-106n. For example, the third-party system can include a device manufacturer (e.g., a television manufacturer) that collects media consumption data from users by utilizing information from the client applications 116a-116n. Accordingly, the client devices 106a-106n can report media consumption data to the device manufacturer, which can then pass the media consumption data to the media analytics system 118.

The media analytics system 118 can provide analysis of the media consumption of users of the client devices 106a-106n to the administrator device 104. For instance, the media analytics system 118 can provide statistical breakdowns of the media consumption of the users based on the demographics of the users. The media analytics system 118 can also provide analysis of assets corresponding to the administrator device 104 (e.g., advertisements or marketing content provided by a marketing entity associated with the administrator device 104). To illustrate, the media analytics system 118 can allow the administrator to view a performance of advertisements or other assets in connection with media content that the media distributor system 108 provides, including a specific time period, media content provided during the time period, how many users consumed the media content, etc.

As previously mentioned, the media analytics system 118 includes the multi-RNN prediction system 102 that generates media consumption predictions to provide to the administrator device 104. In particular, the multi-RNN prediction system 102 utilizes a plurality of recurrent neural networks (e.g., LSTM neural networks) to generate a prediction for a target audience. For example, the multi-RNN prediction system 102 can train a plurality of LSTM neural networks for a plurality of users to generate a plurality of media consumption predictions for the users based on historical media consumption data maintained by the media analytics system 118. Specifically, the multi-RNN prediction system 102 uses the LSTM neural networks to learn media consumption habits, trends, and preferences of the users for generating predictions for a variety of target audiences including different combinations of the users.

In one or more embodiments, each LSTM neural network corresponds to a unique user of the users corresponding to the client devices 106a-106n. In one or more alternative embodiments, one or more of the LSTM neural networks corresponds to a small, unique group of users (e.g., two or three users sharing common characteristics) of the users corresponding to the client devices 106a-106n. In either case, the multi-RNN prediction system 102 utilizes a plurality of LSTM neural networks to generate a plurality of separate media consumption predictions for a target audience. The multi-RNN prediction system 102 then generates a combined media consumption prediction for the target audience based on the outputs of the plurality of LSTM neural networks and provides the prediction to the administrator device 104. Accordingly, the multi-RNN prediction system 102 can generate different media consumption predictions for different target audiences based on the LSTM neural networks corresponding to the users in each target audience.

The administrator device 104 can also utilize the media consumption predictions. For example, the administrator device 104 can utilize the media consumption predictions to select media content to provide to the client devices 106a-106n (via the media distributor system 108). Moreover, the administrator device 104 can generate media content based on media consumption predictions (e.g., generate media content specific to a particular target audience most likely to consume media content at a particular time slot).

Although the environment 100 of FIG. 1 is depicted as having various components, the environment 100 may have any number of additional or alternative components (e.g., any number of server devices, client devices, administrator devices, media distributor systems, or other components in communication with the multi-RNN prediction system 102). Additionally, the multi-RNN prediction system 102 can utilize any number of LSTM neural networks (or recurrent neural networks) to generate media consumption predictions for any number of target audiences. Similarly, the multi-RNN prediction system 102 can provide media consumption management services to any number of administrators via any number of administrator devices. Furthermore, more than one component or entity in the environment 100 can implement the operations of the multi-RNN prediction system 102 described herein. Indeed, the multi-RNN prediction system 102 can alternatively be implemented entirely (or in part) on the administrator device 104 or as part of another component or system.

Figure 2:
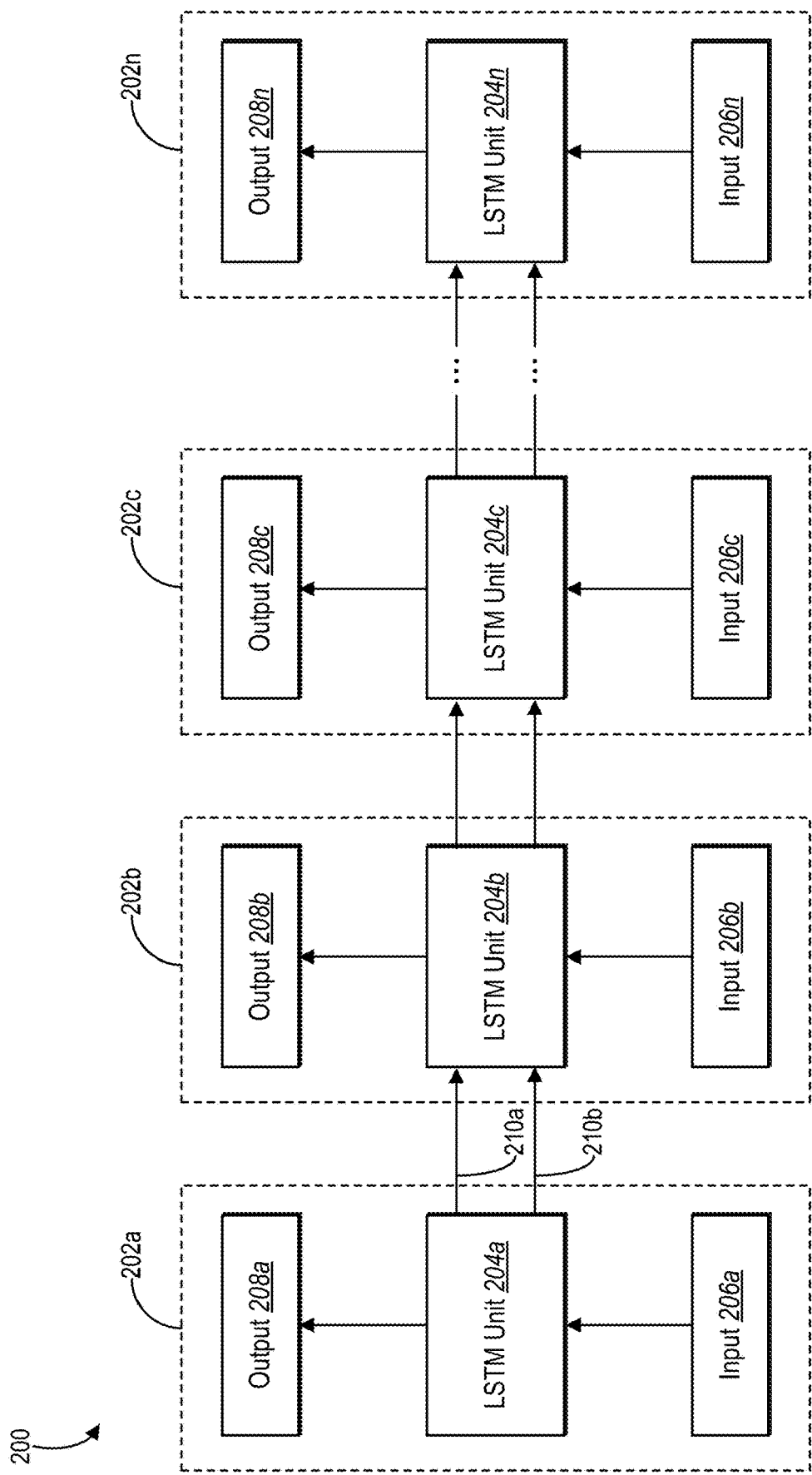
FIG. 2 illustrates a diagram of a long short-term memory neural network in accordance with one or more implementations.

As mentioned above, the multi-RNN prediction system 102 can train and utilize a plurality of LSTM neural networks to generate media consumption predictions for target audiences. FIG. 2 illustrates an embodiment of an LSTM neural network 200. In one or more embodiments, the multi-RNN prediction system 102 trains the LSTM neural network 200 to output media consumption predictions for a single user. Specifically, the multi-RNN prediction system 102 uses historical media consumption data for the user to train the LSTM neural network 200 to recognize media consumption habits, trends, and preferences of the user (e.g., by modifying trainable internal parameters of the neural network). The multi-RNN prediction system 102 then uses the LSTM neural network 200 to predict future media consumption of the user for a plurality of future time periods.

As illustrated, the LSTM neural network 200 includes a plurality of blocks 202a-202n for generating a plurality of media consumption predictions. Each block 202a-202n includes an LSTM unit 204a-204n, an input 206a-206n, and an output 208a-208n. For example, each block 202a-202n receives input 206a-206n associated with a user to use in generating outputs 208a-208n that include media consumption predictions for the user. Specifically, the LSTM units 204a-204n include a plurality of trained parameters that use the information in the received inputs 206a-206n to generate the media consumption predictions at the outputs 208a-208n in accordance with the learned media consumption habits of the user.

To illustrate, FIG. 2 illustrates the multi-RNN prediction system utilizing the LSTM neural network 200 to generate a first media consumption prediction at a first block 202a of the LSTM neural network 200. In particular, a first LSTM unit 204a includes a plurality of internal layers (or gates) that perform a variety of functions for outputting the first media consumption prediction based on one or more values at an input 206a to the first LSTM unit 204a. In one or more embodiments, the layers/gates of the LSTM unit 204a can include a memory cell, an input gate, an output gate, and a forget gate. The LSTM unit 204a receives the input 206a and stores the input 206a and then determines what information to retain in the memory cell of the LSTM unit 204a and then pass to the next LSTM unit 204b.

The multi-RNN prediction system 102 trains the LSTM unit 204a to retain and pass on information from the input 206a during a training stage. As mentioned, the multi-RNN prediction system 102 trains the LSTM neural network 200 using historical media consumption data for a user. The historical media consumption data includes information about the user's past media consumption over a plurality of time periods. The historical media consumption data can be maintained in a database (e.g., by the media analytics system 118 of FIG. 1) and can include media consumption for a large number of days. In at least some implementations, the training dataset can include media consumption for one or more months or several years. Accordingly, the multi-RNN prediction system 102 trains the LSTM unit 204a to recognize the media consumption habits of the user based on the training dataset by setting and/or adjusting one or more parameters that apply weights to input data (including the inputs 206a-206n and data passed between blocks 202a-202n).

In one or more embodiments, the inputs 206a-206n include data associated with a user that allows the LSTM neural network 200 to determine parameters that indicate media that the user is likely to consume during a future time period. For instance, each of the inputs 206a-206n can include a predetermined amount of time corresponding to a media time slot (e.g., every 30 minutes corresponds to a different time slot). Accordingly, in one or more embodiments, the multi-RNN prediction system 102 inputs a first time slot to the first LSTM unit 204a, a chronologically subsequent time slot to the second LSTM unit 204b, etc., resulting in each block 202a-202n including an output 208a-208n that includes a prediction for the corresponding time slot. Furthermore, the inputs 206a-206n can include information about available programming during the corresponding time slots including network names/information or programs airing during the time slots. The inputs 206a-206n can further include information indicating one or more user preferences that a user can modify such as favorited networks/programs that can indicate whether the user is likely to prefer any network/program over another. The inputs 206a-206n can also include user-specific information (e.g., characteristics of the user) and feature information specific to the time slot (time, date, month, whether the time slot falls on a holiday, etc.).

As shown, the LSTM unit 204a outputs a plurality of signals to LSTM unit 204b in a second block 202b. Specifically, the LSTM unit 204a can output a first signal 210a that includes hidden state information (e.g., a latent feature vector) from the LSTM unit 204a. For example, the hidden state information can be sequence data that includes internal parameters or other significant features that the LSTM neural network 200 cells/blocks have determined over time in connection with predicting media consumption for the user. Each subsequent block 202b-202n can use the hidden state information from previous blocks to capture and pass data corresponding to the sequential nature of the outputs of the previous blocks.

The LSTM unit 204a can also output a second signal 210b that includes cell state information from the LSTM unit 204a. In particular, as mentioned previously, the cell state information includes long-term dependencies that may not be captured in the hidden state information. For example, the cell state information allows the LSTM neural network 200 to connect previous information from previous blocks to a current block. This allows the LSTM neural network 200 to more accurately predict media consumption of the user by considering the long-term dependencies that may not otherwise be identified without the cell state information. For example, the cell state can include information stored in a memory cell (based on all previous blocks) prior to application of an output gate that generates the hidden state information for a particular block.

As briefly described above, each LSTM unit 204a-204n can generate an output 208a-208n that includes a media consumption prediction. Because each block 202a-202n corresponds to a different time period, each LSTM unit 204a-204n generates a prediction of the user's media consumption for the corresponding time period. For instance, the first LSTM unit 204a generates an output 208a including a media consumption prediction for a first time slot (e.g., 12:00 am on a Monday). In one or more embodiments, the media consumption prediction includes a vector of probabilities corresponding to the available networks or programs for the first time slot, as described in more detail with respect to FIGS. 6A-6C. Furthermore, the second LSTM unit 204b generates an output 208b including a media consumption prediction (e.g., vector of probabilities) for a second time slot sequentially after the first time slot, and so on until the last LSTM unit 204n.

In one or more embodiments, the multi-RNN prediction system 102 performs an initial training stage of the LSTM neural network 200 based on historical media consumption data for the user. After the initial training stage, the multi-RNN prediction system 102 can perform training stages at regular intervals based on new media consumption data that the multi-RNN prediction system 102 obtains and then compares to media consumption prediction output of the LSTM neural network 200. For instance, the multi-RNN prediction system 102 can perform training stages every month (or other regular time period) based on the new media consumption data collected during the previous month.

In addition to regular training stages, the multi-RNN prediction system 102 can update the states of the LSTM units 204a-204n of the LSTM neural network 200. Updating the states of the LSTM units 204a-204n can include updating information of the cell states of the LSTM units 204a-204n based on new media consumption data. This allows the multi-RNN prediction system 102 to quickly capture new trend/habit information associated with the user without modifying parameters of the LSTM neural network 200. The multi-RNN prediction system 102 can also use the new media consumption data to capture the new trend/habit information in the LSTM neural network 200 during the next training stage by modifying one or more tunable parameters within the neural network, as necessary.

In one or more alternative embodiments, while FIG. 2 describes an LSTM neural network for a single user, the multi-RNN prediction system 102 trains the LSTM neural network 200 to output media consumption predictions for a group of users. In particular, the multi-RNN prediction system 102 uses historical media consumption data for the group of users to train the LSTM neural network 200 to recognize media consumption habits, trends, and preferences of the group of users. The multi-RNN prediction system 102 then uses the LSTM neural network 200 to predict future media consumption of the group of users for a plurality of future time periods. By training each LSTM neural network for a small group of users, the multi-RNN prediction system 102 can scale to larger target audiences while maintaining prediction accuracy.

Additionally, while FIG. 2 illustrates an embodiment of an LSTM neural network, the multi-RNN prediction system 102 can use any type of recurrent neural network for predicting media consumption of a user. Specifically, the multi-RNN prediction system 102 can use any type of recurrent neural network capable of analyzing time series data including historical media consumption of a user to make predictions of future media consumption for the user. For instance, the multi-RNN prediction system can utilize a fully recurrent neural network or other recurrent neural network capable of learning short and/or long-term dependencies in the time series data and utilizing those dependencies to make predictions based on those dependencies.

Figure 3:
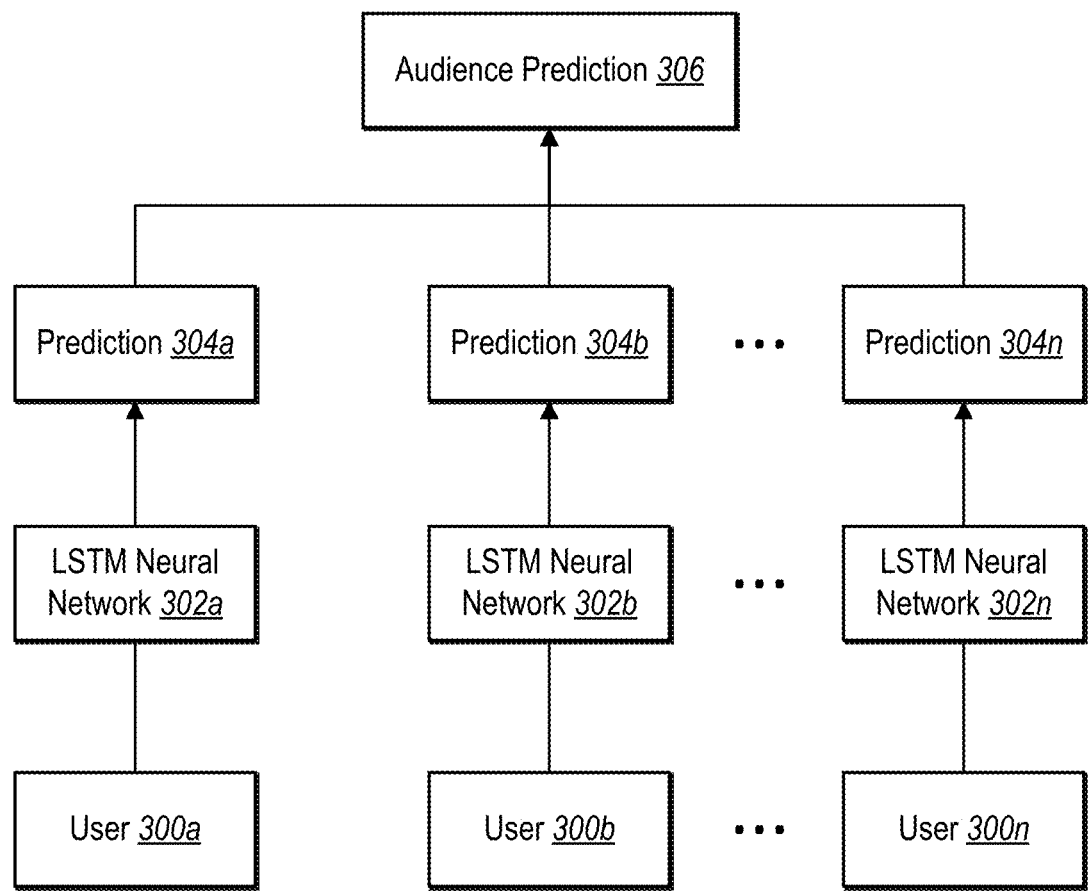
FIG. 3 illustrates a diagram of generating a media consumption prediction for a target audience utilizing a plurality of long short-term memory neural networks in accordance with one or more implementations.

As mentioned previously, the multi-RNN prediction system 102 can generate a prediction for a target audience by using a plurality of LSTM neural networks associated with a plurality of users. FIG. 3 illustrates the multi-RNN prediction system 102 generating a prediction for a target audience in accordance with one or more embodiments. Specifically, the multi-RNN prediction system 102 first identifies a target audience for providing media via a distribution channel. The multi-RNN prediction system 102 can receive a selected target audience from an administrator device (e.g., administrator device 104 of FIG. 1). For instance, the target audience can be a pre-defined target audience including a plurality of common characteristics of users in the target audience. Alternatively, the target audience can be a manually-defined target audience based on one or more selected characteristics from the administrator device.

Additionally, the multi-RNN prediction system 102 can determine a plurality of users 300a-300n in the target audience associated with the multi-RNN prediction system 102. For example, the multi-RNN prediction system 102 can determine the plurality of users 300a-300n based on the users 300a-300n being registered (or otherwise associated) with the multi-RNN prediction system 102. Furthermore, the multi-RNN prediction system 102 can determine the users 300a-300n based on the users 300a-300n having the characteristics that correspond to the target audience (e.g., users within a certain age range or having a specific gender).

Once the multi-RNN prediction system 102 has determined the users 300a-300n of the target audience, the multi-RNN prediction system 102 identifies LSTM neural networks 302a-302n that the multi-RNN prediction system 102 has previously trained for the users 300a-300n for generating media consumption predictions for the target audience. For instance, as mentioned, the multi-RNN prediction system 102 can train an LSTM neural network for each individual user. Accordingly, the multi-RNN prediction system 102 can include as many LSTM neural networks as there are users identified for the target audience.

In one or more embodiments, the multi-RNN prediction system 102 trains the LSTM neural networks 302a-302n for the users 300a-300n by first identifying historical media consumption sequences for the users 300a-300n. In particular, the multi-RNN prediction system 102 identifies media content (e.g., programs and/or networks) that the users 300a-300n previously consumed during a plurality of past sequential time periods. In one illustrative example, a historical media consumption sequence for a user (e.g., user 300a) includes television networks/programs that the user has viewed during each 30-minute period over the past two months. Accordingly, the historical media consumption sequences for each of the other users in the target audiences include the television networks/programs that the users viewed during the same 30-minute periods over the past two months.

Furthermore, because the LSTM neural networks 302a-302n are trained for unique users, the multi-RNN prediction system 102 captures the media consumption habits and trends of the users 300a-300n. For example, the multi-RNN prediction system 102 can determine, from a given user's media consumption history, that the user tends to watch certain networks at certain times of day. Accordingly, the multi-RNN prediction system 102 trains the LSTM neural network for that user to learn the user's viewing preferences by setting/adjusting one or more of the parameters of the LSTM neural network to generate outputs that reflect the learned viewing preferences.

As shown in FIG. 3, the multi-RNN prediction system 102 then generates predictions 304a-304n using the trained LSTM neural networks 302a-302n. Specifically, the LSTM neural networks 302a-302n can generate an output that indicate a prediction of media consumption for the users 300a-300n for a future time period. To illustrate, as previously mentioned with respect to FIG. 2, and as described in more detail with respect to FIGS. 6A-6C, the LSTM neural networks 302a-302n can output vectors indicating probabilities that the users 300a-300n will view specific networks or programs during the future time period. Each prediction 304a-304n can thereby include a plurality of probabilities corresponding to the available media content at the given time.

After generating the predictions 304a-304n for the users 300a-300n, the multi-RNN prediction system 102 generates an audience prediction 306 of likely media consumption for the target audience. Specifically, the multi-RNN prediction system 102 determines the predictions for each of the users 300a-300n in the target audience and then combines the predictions 304a-304n to create a combined prediction that reflects the likely media consumption of all of the users 300a-300n. For instance, the multi-RNN prediction system 102 can generate the audience prediction 306 by combining the predictions 304a-304n. To illustrate, the multi-RNN prediction system 102 can combine the predictions 304a-304n by summing or multiplying corresponding values in the vectors of the predictions 304a-304n to obtain a vector of combined values.

In one or more embodiments, once the multi-RNN prediction system 102 has combined the predictions 304a-304n, the multi-RNN prediction system 102 determines the audience prediction 306 by selecting the highest value of the vector of combined values. In particular, the highest value of the vector of combined values indicates a highest probability that members of the target audiences will consume the corresponding media content (e.g., network/program). For instance, if many of the users 300a-300n are most likely to watch a given network (e.g., a sports network) within the time period, the combined values can provide an indication of high probability with a high combined value. Alternatively, if another network (e.g., a news network) scores low with many of the users 300a-300n, the combined value for that network can also indicate such.

FIG. 3 illustrates the multi-RNN prediction system 102 generating an audience prediction 306 for a single time period. Using the concepts of FIG. 3, the multi-RNN prediction system 102 can generate a plurality of audience predictions for a plurality of time periods. For instance, the LSTM neural networks 302a-302n can output a plurality of predictions for sequential time periods. The multi-RNN prediction system 102 can then generate a plurality of audience predictions for the target audience for the sequential time periods. The multi-RNN prediction system 102 can thus output any number of audience predictions for future time periods based on predictions for the users in the target audience, as may serve a particular implementation.

While the description above with respect to FIG. 3 indicates that the multi-RNN prediction system 102 can determine the users of a target audience prior to obtaining predictions from the LSTM neural networks of the users, the multi-RNN prediction system 102 can perform the operations in any order. For example, the multi-RNN prediction system 102 can train LSTM neural networks for all available users to output probabilities without being in a current target audience. The multi-RNN prediction system 102 can then receive a selection of a target audience (or otherwise determine the target audience) and then select the LSTM neural networks of users within the target audience. Because the LSTM neural networks are already outputting predictions for the users, the multi-RNN prediction system 102 can quickly obtain predictions of media consumption for the users and then generate an audience prediction for the target audience as a whole.

Figure 4:
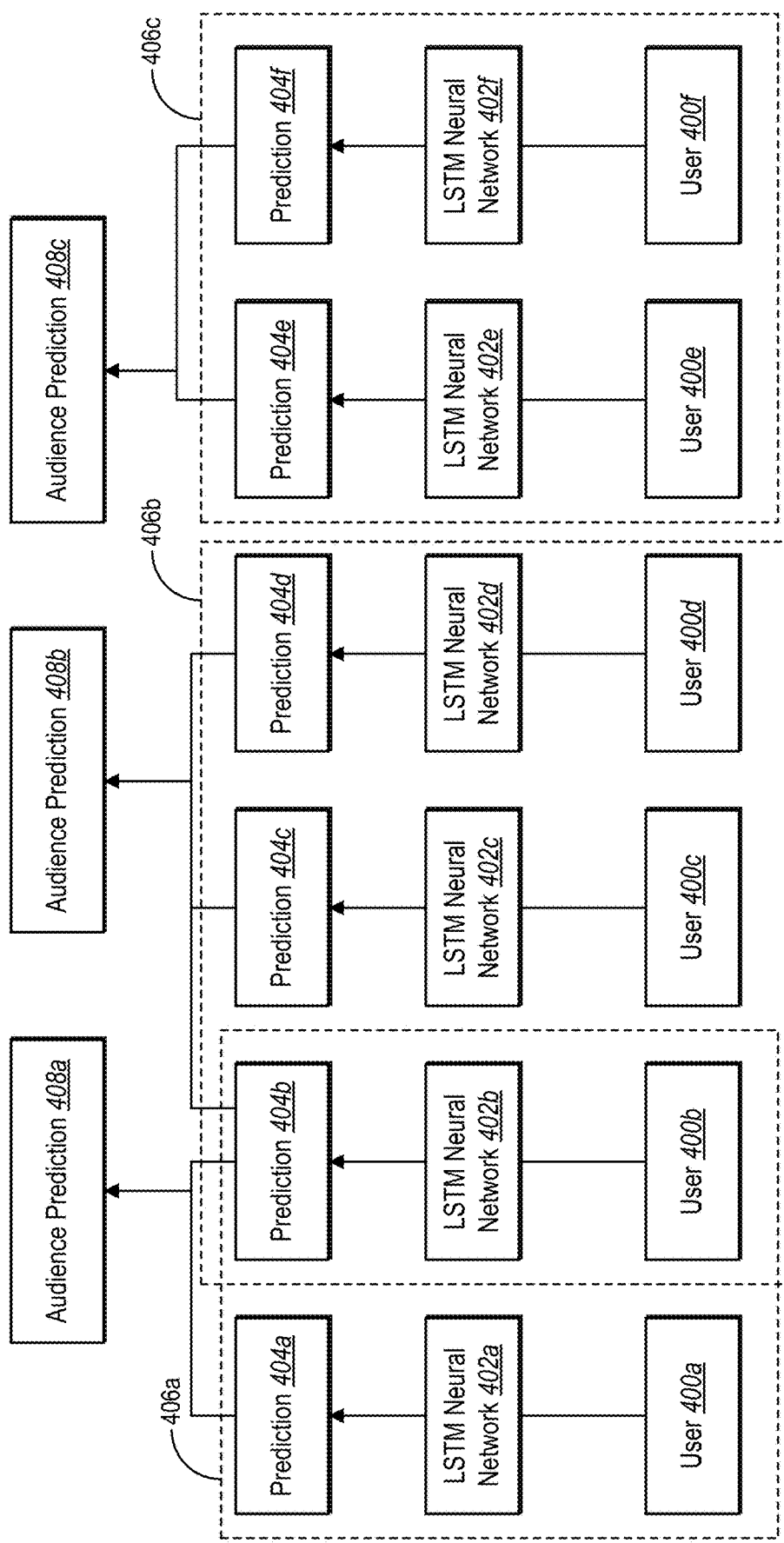
FIG. 4 illustrates a diagram of a process of generating predictions of media consumption for a plurality of target audiences in accordance with one or more implementations.

As just discussed, the multi-RNN prediction system 102 can generate media consumption predictions for a variety of audiences. FIG. 4 illustrates a process of generating predictions for different target audiences. In particular, a plurality of users 400a-400f are associated with the multi-RNN prediction system 102 such that the multi-RNN prediction system 102 can obtain historical media consumption data for the users 400a-400f. The multi-RNN prediction system 102 also trains a plurality of LSTM neural networks 402a-402f for the users 400a-400f based on the historical media consumption data for the users 400a-400f. The LSTM neural networks 402a-402f generate predictions 404a-404f of media consumption for the users 400a-400f based on learned behaviors and patterns from the historical media consumption data.

In one or more embodiments, each LSTM neural network 402a-402f outputs a prediction 404a-404f for the corresponding user 400a-400f for a given time period. The multi-RNN prediction system 102 can then determine that the users 400a-400f belong to one or more target audiences 406a-406c. For example, the multi-RNN prediction system 102 can determine that user 400a and user 400b belong to a first target audience 406a. The multi-RNN prediction system 102 can also determine that user 400b, user 400c, and user 400d belong to a second target audience 406b. The multi-RNN prediction system 102 can further determine that user 400e and user 400f belong to a third target audience 406c. As illustrated, the first target audience 406a and the second target audience 406b both include the user 400b, while the third target audience 406c does not have any users in common with the first target audience 406a and the second target audience 406b.

In response to identifying the target audiences 406a-406c and determining the target audiences to which each user 400a-400f belongs, the multi-RNN prediction system 102 can use the predictions 404a-404f to generate audience predictions 408a-408c for the target audiences 406a-406c. For instance, the multi-RNN prediction system 102 generates a first audience prediction 408a for the first target audience 406a based on the predictions 404a-404b for the users 400a-404b. Additionally, the multi-RNN prediction system 102 generates a second audience prediction 408b for the second target audience 406b based on the predictions 404b-404d for the users 400b-400d. The multi-RNN prediction system 102 also generates a third audience prediction 408c for the third target audience 406c based on the predictions 404e-404f for the users 400e-400f.

Figure 5:
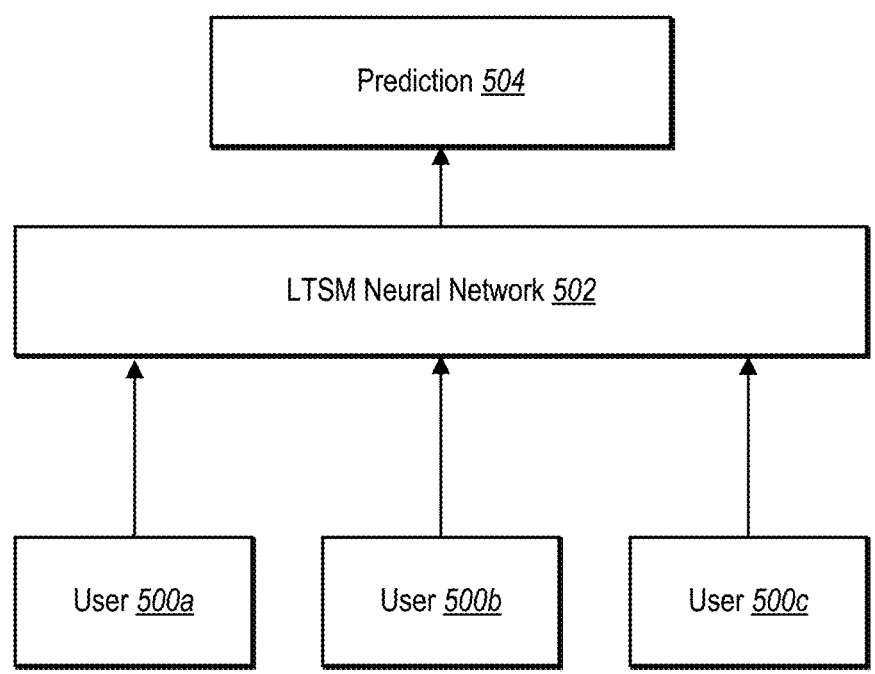
FIG. 5 illustrates a diagram of a process of generating a prediction of media consumption using a long short-term memory neural network for a group of users in accordance with one or more implementations.

In addition to training LSTM neural networks for unique users, the multi-RNN prediction system 102 can train LSTM neural networks for groups of users. As mentioned previously, the multi-RNN prediction system 102 can train LSTM neural networks for small groups of users. For example, as illustrated in FIG. 5, the multi-RNN prediction system 102 can identify a plurality of users 500a-500c for training an LSTM neural network 502. To illustrate, the multi-RNN prediction system 102 can identify a group of three users for the LSTM neural network 502. The multi-RNN prediction system 102 can similarly identify other groups of users for training additional LSTM neural networks.

In particular, the multi-RNN prediction system 102 can determine that the users 500a-500c have one or more common characteristics allowing the multi-RNN prediction system 102 to train the LSTM neural network 504 to output accurate predictions. For instance, the multi-RNN prediction system 102 can determine that the users 500a-500c have similar historical media consumption data. In some embodiments, the multi-RNN prediction system 102 can determine that the users 500a-500c have a threshold number or type of common characteristics (e.g., age, gender, and location). Alternatively, the multi-RNN prediction system 102 can determine that the users 500a-500c have diverse historical media consumption data for training the LSTM neural network 502 to identify patterns from varied interests. In other implementations, the multi-RNN prediction system identifies the users 500a-500c randomly from a larger group of users.

As described in relation to FIGS. 3-5, the multi-RNN prediction system 102 can perform operations for training and utilizing a plurality of LSTM neural networks for a plurality of users to generate media consumption predictions for one or more target audiences. The operations allow the multi-RNN prediction system to train each LSTM neural network for a unique user (or small group of users) and then use the outputs of the LSTM neural networks to generate a prediction for a target audience. Accordingly, the acts and operations illustrated and described above in relation to FIGS. 3-5 provide the corresponding structure for an example step for generating a media consumption prediction for the target audience utilizing a plurality of long short-term neural networks corresponding to the plurality of users.

Figure 6B:
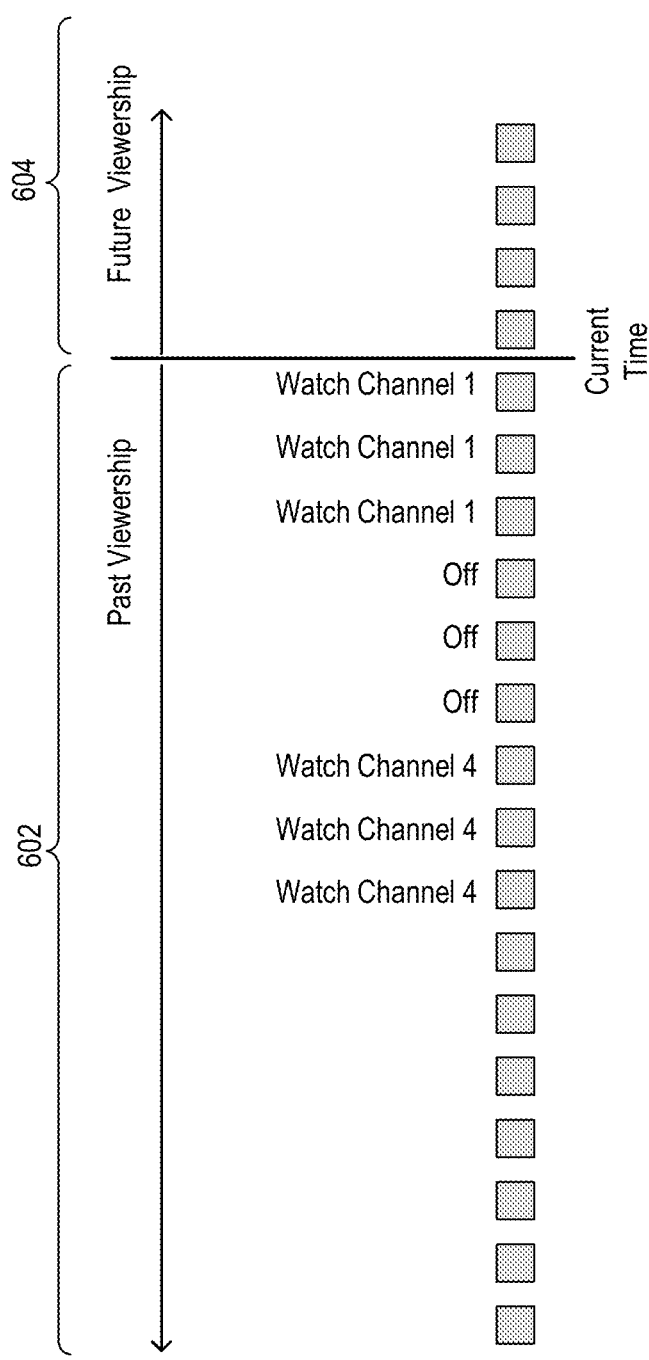
Figure 6C:
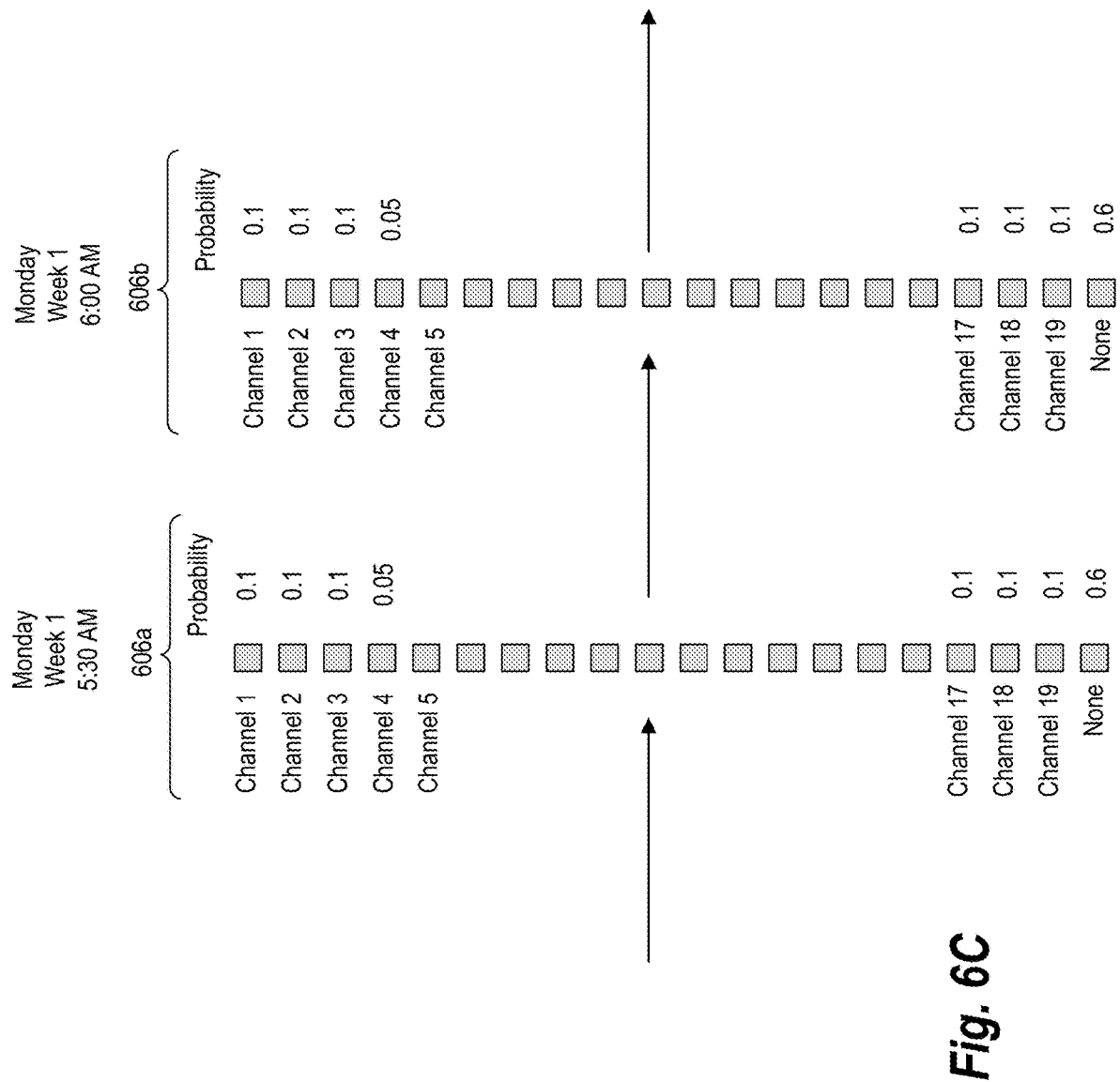

As previously mentioned, the multi-RNN prediction system 102 can generate predictions including vectors of probabilities for a future time period. FIGS. 6A-6C illustrate embodiments of inputs and outputs of neural networks of the multi-RNN prediction system 102. Specifically, FIG. 6A illustrates outputs of a plurality of neural networks corresponding to a plurality of users. FIG. 6B illustrates time series data input into a neural network and output data of the neural network based on the input data. FIG. 6C illustrates a plurality of sequential media consumption prediction outputs of a neural network for a user.

In one or more embodiments, the multi-RNN prediction system 102 generates a vector for each user using a corresponding neural network, as illustrated in FIG. 6A. In particular, a vector can include a plurality of probabilities corresponding to available media channels (or media content) for a particular time period. For instance, each vector output of a neural network includes probabilities that the corresponding user will consume specific media channels (or media content) available during a given time period. Accordingly, the vectors provide an indication of the most likely media channels or content the users will consume during the future time period.

To illustrate, a first vector 600 includes probabilities that a first user will watch a plurality of networks (e.g., "Channel 1" through "Channel 19") available during a selected time period (e.g., Monday at 5:30 am in a first week). The first vector 600a thus includes a numerical value between 0 and 1 that indicates a likelihood of the first user viewing each network during the time period. Additionally, the first vector 600a can include a probability that the first user will not consume any media content during the time period. Accordingly, the first vector 600a of FIG. 6A includes 20 numerical values representing the various probabilities associated with the available media content.

Similarly, FIG. 6A illustrates a second vector 600b and a third vector 600c corresponding to additional users. Specifically, the second vector 600b includes a plurality of probabilities that a second user will watch the plurality of networks available during the selected time period. The third vector 600c likewise includes a plurality of probabilities that a third user will watch the plurality of networks available during the selected time period.

As shown, the multi-RNN prediction system 102 calculates the probabilities for the networks to determine which network each user is most likely to watch. Because each user has his or her own preferences and habits for consuming media content, the generated probabilities for the networks can be different for each user. Similarly, one or more of the probabilities for the networks can be the same for one or more users based on the users' historical media consumption data and the corresponding neural networks. FIG. 6A illustrates that the first vector 600a has a highest shown probability value of 0.6 for "None," indicating that the first user is most likely not to watch any of the networks during the selected time period. Additionally, the second vector 600b and the third vector 600c have highest shown probability values of 0.3 for "Channel 17," indicating that both users are most likely to watch the same network during the selected time period.

FIG. 6B illustrates time series data representing historical media consumption data and future media consumption for a user. Specifically, FIG. 6B illustrates a historical viewership dataset 602 for the user. The historical viewership dataset 602 includes a sequence of chronological time periods for which the multi-RNN prediction system 102 has obtained media consumption data for the user. The historical viewership dataset 602 includes every network that the user watched within each time period for a range of dates corresponding to the historical viewership dataset 602.

Using the time series data from the historical viewership dataset 602, the multi-RNN prediction system 102 trains a neural network (e.g., an LSTM neural network, as previously described) to recognize viewing habits of the user at various times of day, various times of a typical week, various weeks of each month, or various times of year. In particular, the multi-RNN prediction system 102 can utilize the historical viewership dataset 602 to determine that the user tends to watch a specific network (e.g., "Channel 4") during a specific time period (e.g., minute, hour, day, week of the year). The multi-RNN prediction system 102 can also utilize information about specific programs on the networks for each time period to learn which programs the user tends to watch.

Based on the historical viewership dataset 602, the multi-RNN prediction system 102 can then generate predictions for a set 604 of future time periods. The predictions for the set 604 of future time periods include predictions of media consumption for the future time periods based on the learned viewing habits of the user. To illustrate, the multi-RNN prediction system 102 can use the learned viewing habits of the user to generate a prediction that the user will view "Channel 4" during the same hour and day of the next week.

Additionally, the multi-RNN prediction system 102 can determine seasonal trends indicating that the user tends to watch a set of networks at a certain time of year. For instance, if the user tends to watch sports networks presenting football games in the fall months, but not during the summer months, the multi-RNN prediction system 102 can utilize such knowledge to generate predictions according to the time of year. Thus, the multi-RNN prediction system 102 can generate a prediction of a specific network for the user during a specific hour and day of a first week and then generate a prediction of a different network during the same hour and day of a following week based on the seasonal change. The multi-RNN prediction system 102 can also use media guide information to determine whether certain content is available during each time period to determine when to adjust such predictions.

Furthermore, as previously mentioned, the multi-RNN prediction system 102 can utilize recent viewing information to determine changes in user habits. Specifically, the multi-RNN prediction system 102 can continue training and updating the neural network for the user with new media consumption data. More specifically, the multi-RNN prediction system 102 can use predictions for the future time periods to compare against ground truth consumption values as time passes to determine how to update states of the neural network and/or adjust parameters of the neural network, if necessary, to reduce error in the predictions. This allows the neural network to make adjustments for recent changes in viewing habits based on new media content available or simply based on changes in the user's preferences. The multi-RNN prediction system 102 can take into account the new trend information when generating predictions so that the predictions reflect the user's new viewing habits.

FIG. 6C illustrates an output of a neural network for a user for a plurality of sequential time periods. In particular, as briefly mentioned, the multi-RNN prediction system 102 uses the neural network to generate a plurality of predictions for each network available during each time period. A first set 606a of predictions corresponds to a first time period (e.g., 5:30 am on Monday of a first week), and a second set 606b of predictions corresponds to a second time period (e.g., 6:00 am on Monday of the first week). As illustrated, the time periods are sequential such that the second time period occurs chronologically after the first time period.

The multi-RNN prediction system 102 can then utilize the predictions for the user in connection with predictions for other users of a target audience to generate predictions for the plurality of time periods for the target audience as a whole. Thus, the multi-RNN prediction system 102 can generate a plurality of time-sequential predictions for the target audience in accordance with the time-sequential predictions for each of the users. To illustrate, generating predictions for a target audience based on the predictions of FIG. 6C includes combining the probabilities of viewership for the networks for the user with probabilities of viewership of the networks for each other user in the target audience for which the multi-RNN prediction system 102 has a neural network. The multi-RNN prediction system 102 can thus generate a first audience prediction for the first time period (i.e., 5:30 am) based on the first set 606a of predictions (with predictions for the other users) and a second audience prediction for the next time period (i.e., 6:00 am) based on the second set 606b of predictions (with predictions for the other users).

Figure 7A:
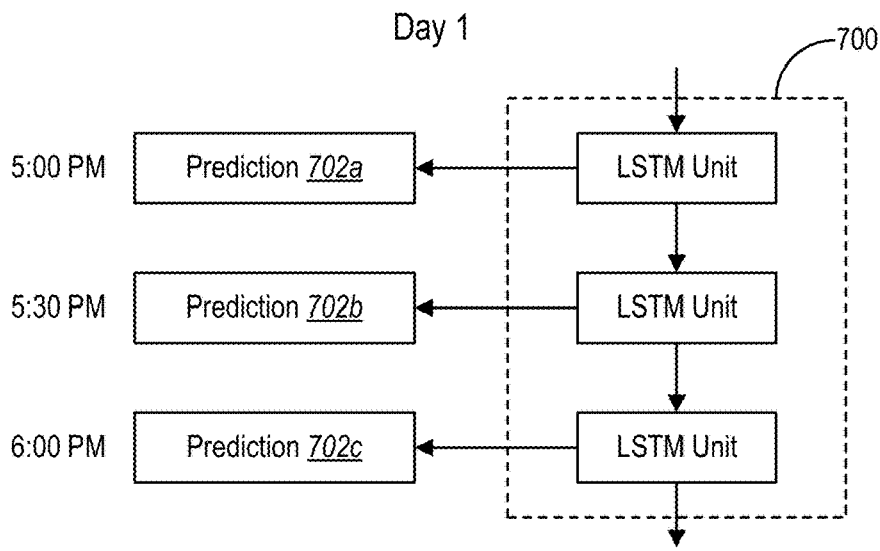
FIGS. 7A-7C illustrate diagrams of a process of training and updating a long short-term memory neural network in accordance with one or more implementations.
Figure 7B:
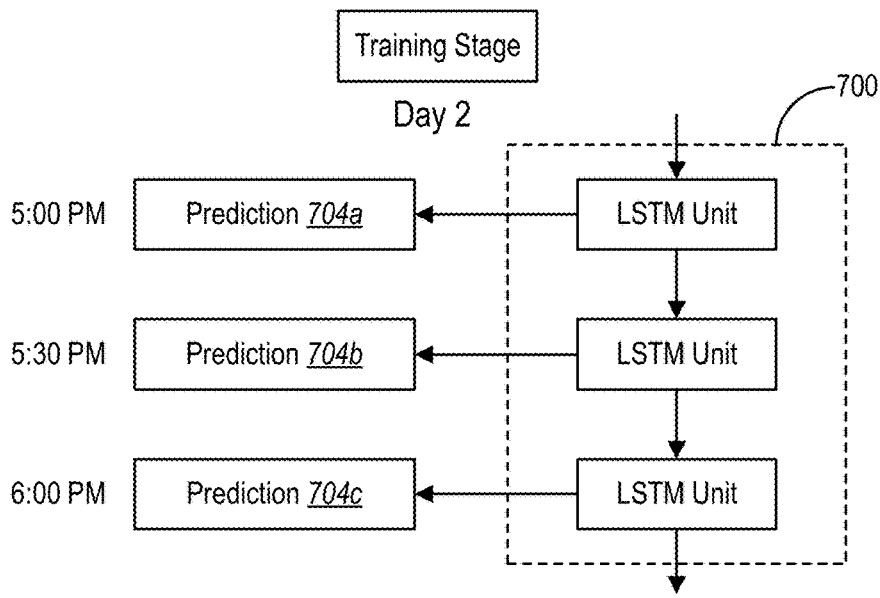
Figure 7C:
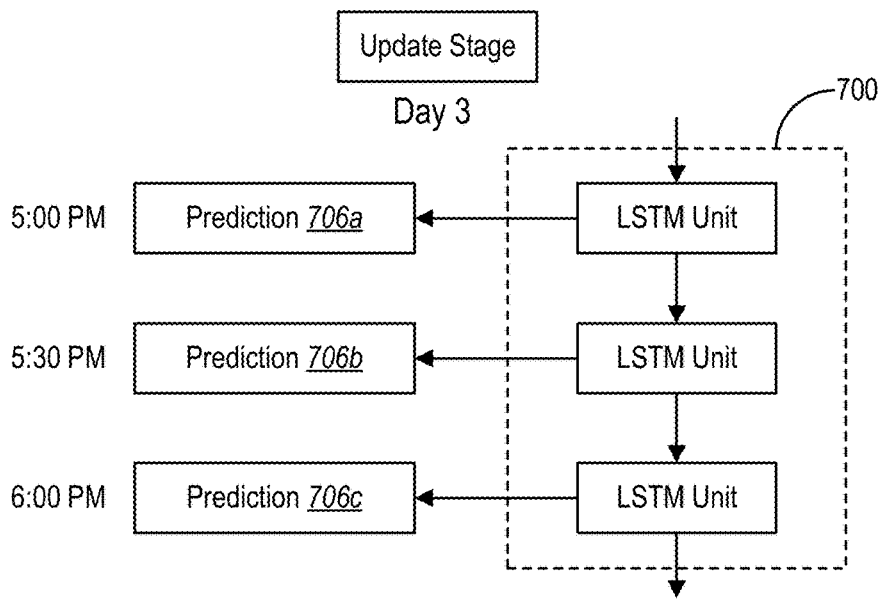

As mentioned, the multi-RNN prediction system 102 can perform training stages and update stages for improving the performance of a neural network to capture new trends and information. FIGS. 7A-7C illustrate a process of training and updating a neural network based on media consumption of a user. For example, FIG. 7A illustrates a first set of outputs of a neural network 700 on a first day. FIG. 7B illustrates a second set of outputs of the neural network 700 on a second day after a training stage. FIG. 7C illustrates a third set of outputs of the neural network 700 on a third day after an update stage.

As illustrated, FIG. 7A includes a neural network 700 that generates a plurality of predictions 702a-702c based on historical media consumption data for the user. Specifically, the multi-RNN prediction system 102 has previously trained the neural network 700 in an initial training stage using the historical media consumption data for the user. The plurality of predictions 702a-702c reflect the long and short-term patterns and habits of the user that the neural network 700 learns during the initial training stage. The plurality of predictions 702a-702c can include predictions for a first day after the initial training stage.

FIG. 7B illustrates a plurality of predictions 704a-704c of the neural network 700 after a second training stage. As mentioned, the multi-RNN prediction system 102 can perform regular training stages (e.g., monthly) for the neural network 700 to adjust parameters of the neural network 700 to reflect newly learned patterns and habits of the user. For instance, the multi-RNN prediction system 102 obtains ground truth consumption values for time periods corresponding to the predictions 702a-702c (and any other predictions between the first day and the second training stage). The multi-RNN prediction system 102 then compares the ground truth consumption values to the predictions 702a-702c and updates the parameters of the neural network 700 to reduce error in the prediction values. The multi-RNN prediction system 102 then uses the neural network 700 to generate the predictions 704a-704c for the second day based on the adjusted parameters of the neural network 700.

In addition, the multi-RNN prediction system 102 can perform regular updates of the neural network 700 without performing a training stage for the neural network 700. In particular, the multi-RNN prediction system 102 can perform regular update stages (e.g., daily) to update cell states of LSTM units of each LSTM stage in the neural network 700. Specifically, the multi-RNN prediction system 102 can use the ground truth consumption values corresponding to the predictions 704a-704c and then update the cell states or other layer logic to reflect any changes in user behavior or habits without modifying trained parameters of the neural network 700. The multi-RNN prediction system 102 can update the neural network 700 accordingly at any time between training stages to quickly improve the performance of the neural network 700 without requiring a full training stage.

FIG. 7C illustrates a plurality of predictions 706a-706c of the neural network 700 after the second training stage and after an update stage. Specifically, the multi-RNN prediction system 102 can generate the predictions 706a-706c to reflect patterns learned during the second training stage (e.g., based on the adjusted parameters) and during the update stage (e.g., based on updated cell states/logic). This allows the multi-RNN prediction system 102 to maintain a neural network 700 that provides accurate and timely predictions of media consumption for the user without requiring more frequent training stages.

In addition, the multi-RNN prediction system 102 can utilize a flexible training schedule that allows for staggered training stages for different neural networks. Specifically, the multi-RNN prediction system 102 can perform training stages for neural networks of different users at different times instead of performing all training for neural networks corresponding to a target audience at once. By staggering the training stages, the multi-RNN prediction system 102 can spread the computing resource load over a longer period of time, resulting in the need for fewer computing resources and less downtime (e.g., less consecutive downtime). Specifically, rather than training a single neural network based on media consumption data for hundreds of thousands or millions of users, the multi-RNN prediction system 102 can stagger the training of many independent models based on unique users (or small groups of users) over a greater time period.

Figure 8:
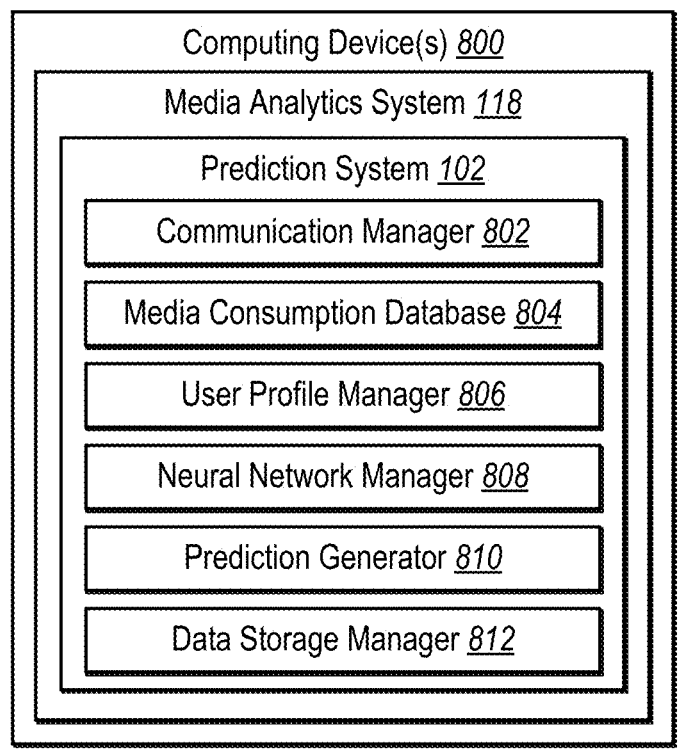
FIG. 8 illustrates a diagram of the multi-RNN prediction system of FIG. 1 in accordance with one or more implementations.

As described in relation to FIGS. 1-7C, the multi-RNN prediction system can thus perform operations for training and utilizing a plurality of neural networks for a plurality of users to generate a media consumption prediction for a target audience. FIG. 8 illustrates a detailed schematic diagram of an embodiment of the multi-RNN prediction system described above. As shown, the multi-RNN prediction system 102 can be implemented on computing device(s) 800

(e.g., a client device, administrator device, and/or a server device as described in FIG. 1 and as further described below in relation to FIG. 10). Additionally, the multi-RNN prediction system 102 can include, but is not limited to, a communication manager 802, a media consumption database 804, a user profile manager 806, a neural network manager 808, a prediction generator 810, and a data storage manager 812. The multi-RNN prediction system 102 can be implemented on any number of computing devices. For example, the multi-RNN prediction system 102 can be implemented in a distributed system of server devices for generating media consumption predictions to provide to one or more entities. Alternatively, the multi-RNN prediction system 102 can be implemented on a single computing device such as a single client device running a client application that generates media consumption predictions for various target audiences.

In one or more embodiments, each of the components of the multi-RNN prediction system 102 are in communication with one another using any suitable communication technologies. Additionally, the components of the multi-RNN prediction system 102 can be in communication with one or more other devices including other computing devices of a user, server devices (e.g., cloud storage devices), licensing servers, or other devices/systems. It will be recognized that although the components of the multi-RNN prediction system 102 are shown to be separate in FIG. 8, any of the subcomponents may be combined into fewer components, such as into a single component, or divided into more components as may serve a particular implementation. Furthermore, although the components of FIG. 8 are described in connection with the multi-RNN prediction system 102, at least some of the components for performing operations in conjunction with the multi-RNN prediction system 102 described herein may be implemented on other devices within the environment.

The components of the multi-RNN prediction system 102 can include software, hardware, or both. For example, the components of the multi-RNN prediction system 102 can include one or more instructions stored on a computer-readable storage medium and executable by processors of one or more computing devices (e.g., the computing device(s) 800). When executed by the one or more processors, the computer-executable instructions of the multi-RNN prediction system 102 can cause the computing device(s) 800 to perform the media consumption prediction operations described herein. Alternatively, the components of the multi-RNN prediction system 102 can comprise hardware, such as a special purpose processing device to perform a certain function or group of functions. Additionally, or alternatively, the components of the multi-RNN prediction system 102 can include a combination of computer-executable instructions and hardware.

Furthermore, the components of the multi-RNN prediction system 102 performing the functions described herein with respect to the multi-RNN prediction system 102 may, for example, be implemented as part of a stand-alone application, as a module of an application, as a plug-in for applications including marketing applications, as a library function or functions that may be called by other applications, and/or as a cloud-computing model. Thus, the components of the multi-RNN prediction system 102 may be implemented as part of a stand-alone application on a personal computing device or a mobile device. Alternatively, or additionally, the components of the multi-RNN prediction system 102 may be implemented in any application that allows media consumption analysis, including, but not limited to ADOBE® PRIMETIME®, ADOBE® ADVERTISING CLOUD®, ADOBE® MARKETING CLOUD®, and ADOBE® MEDIA OPTIMIZER® software. "ADOBE," "ADOBE PRIMETIME," "ADOBE ADVERTISING CLOUD," "ADOBE MARKETING CLOUD," and "ADOBE MEDIA OPTIMIZER" are registered trademarks of Adobe Systems Incorporated in the United States and/or other countries.

As mentioned, the multi-RNN prediction system 102 includes a communication manager 802 that facilitates communication between the multi-RNN prediction system 102 and one or more computing devices and/or systems. For example, the communication manager 802 can facilitate communication with one or more client devices of users to obtain media consumption information for the users. Additionally, the communication manager 802 can facilitate communication with one or more administrator devices to provide media consumption data and predictions to an administrator to allow the administrator to make media content decisions. Furthermore, the communication manager 802 can facilitate communication with media distributors to obtain information about available media content (e.g., networks/channels/stations and programming) for specific time periods.

The multi-RNN prediction system 102 also includes a media consumption database 804 to facilitate the management of historical media consumption for a plurality of users. Specifically, the media consumption database 804 can maintain a plurality of historical media consumption sequences for each user over a plurality of time periods. The media consumption database 804 can communicate with the data storage manager 812 to store the historical media consumption sequences for the plurality of users and to provide the historical media consumption sequences to one or more other components of the multi-RNN prediction system 102.

The user profile manager 806 can facilitate the management of user profiles for a plurality of users associated with the multi-RNN prediction system 102. For instance, the user profile manager 806 can generate user profiles based on users registering with the multi-RNN prediction system 102 and/or other entities associated with the multi-RNN prediction system 102 (e.g., a media distributor). The user profile manager 806 can store identifying information, preferences, interests, or other information that allows the multi-RNN prediction system 102 to train neural networks for the users and generate media consumption predictions for the users.

The multi-RNN prediction system 102 also includes a neural network manager 808 to manage a plurality of recurrent neural networks for users associated with the multi-RNN prediction system 102. Specifically, the neural network manager 808 can generate and/or train a plurality of neural networks for users based on the user profiles that the user profile manager 806 manages. To illustrate, the neural network manager 808 can train, for each user or for small groups of users, an LSTM neural network based on the historical media consumption data for the user (or group of users). The neural network manager 808 can also perform additional training stages and/or update stages for adjusting parameters or states associated with the neural networks based on new media consumption data for the users.

The prediction generator 810 facilitates generating predictions for target audiences. In particular, the prediction generator 810 can utilize the neural networks maintained by the neural network manager 808 to generate predictions for users in a target audience for a time period. The prediction generator 810 can also use the predictions for the users based on the neural networks to generate a prediction for the target audience for the time period by combining the predictions for the users. Accordingly, the prediction generator 810 can utilize neural networks for different groups of users to generate predictions for different audiences.

The multi-RNN prediction system 102 also includes a data storage manager 812 (that comprises a non-transitory computer memory) that stores and maintains data associated with generating media consumption predictions using a plurality of recurrent neural networks. For example, the data storage manager 812 can store media consumption data, user profiles, and neural networks associated with users. The data storage manager 812 can also store media consumption predictions and ground truth consumption values for a plurality of users and target audiences over a plurality of time periods.

Figure 9:
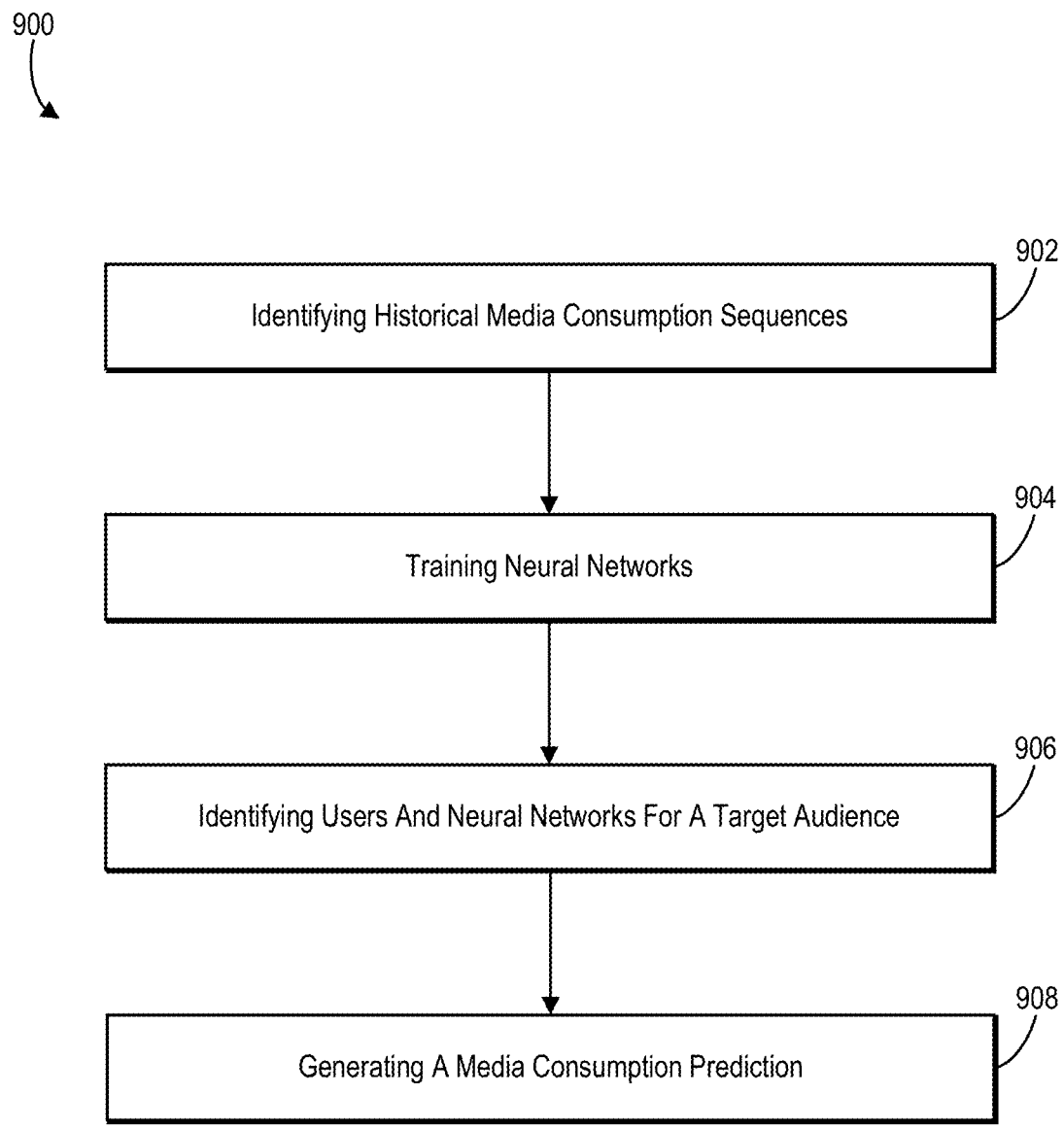
FIG. 9 illustrates a flowchart of a series of acts for utilizing neural networks to predict media consumption in accordance with one or more implementations.

Turning now to FIG. 9, this figure shows a flowchart of a series of acts 900 of utilizing recurrent neural networks to predict media consumption. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As shown, the series of acts 900 includes an act 902 of identifying historical media consumption sequences. For example, act 902 involves identifying a plurality of historical media consumption sequences corresponding to a plurality of users. For example, the plurality of historical media consumption sequences can include, for each user of the plurality of users, a media consumption sequence indicating media content consumed by the user during a plurality of sequential time periods.

As illustrated, the series of acts 900 also includes an act 904 of training neural networks. For example, act 904 involves training a plurality of long short-term memory neural networks based on the historical media consumption sequences of the plurality of users. Act 904 can involve training each long short-term memory neural network of the plurality of long short-term memory neural networks based on a historical media consumption sequence for a unique user. Act 904 can involve training each long short-term memory neural network of the plurality of long short-term memory neural networks based on historical media consumption sequences for a unique group of users.

Additionally, the series of acts 900 also includes an act 906 of identifying users and neural networks for a target audience. For example, act 906 involves a subset of users from the plurality of users corresponding to a target audience and a subset of long short-term memory neural networks corresponding to the subset of users from the plurality of long short-term memory neural networks. Act 906 can involve identifying users that have a characteristic corresponding to the target audience. Furthermore, the subset of long short-term memory neural networks corresponding to the subset of users can comprise long short-term memory neural networks trained using historical media consumption sequences for the subset of users.

The series of acts 900 further includes an act 908 of generating a media consumption prediction. For example, act 908 involves generating a media consumption prediction for the target audience utilizing the subset of long short-term memory neural networks. Act 908 can involve generating, utilizing each long short-term memory neural network of the subset of long short-term memory neural networks, an individual media consumption prediction for a user of the subset of users. Act 908 can then involve combining a plurality of individual media consumption predictions for the subset of users to generate the media consumption prediction for the target audience. Act 908 can also involve generating a plurality of media consumption predictions for the target audience for a plurality of sequential future time periods utilizing the subset of long short-term memory neural networks.

The series of acts 900 can also include obtaining a ground truth consumption value for a first user corresponding to a time period for the media consumption prediction for the target audience, wherein the subset of users and the target audience comprise the first user. The series of acts 900 can include identifying a first long short-term memory neural network corresponding to the first user from the subset of long short-term memory neural networks. The series of acts 900 can then include updating a state of the first long short-term memory neural network corresponding to the first user based on the ground truth consumption value. For example, the series of acts 900 can include updating the state of the first long short-term memory neural network based on the ground truth consumption value after a predetermined time period of a plurality of predetermined time periods prior to a training stage for the plurality of long short-term memory neural networks.

The series of acts 900 can further include identifying a second subset of users from the plurality of users corresponding to a second target audience and a second subset of long short-term memory neural networks corresponding to the second subset of users from the plurality of long short-term memory neural networks. The series of acts 900 can then include generating a second media consumption prediction for the second target audience utilizing the second subset of long short-term memory neural networks.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
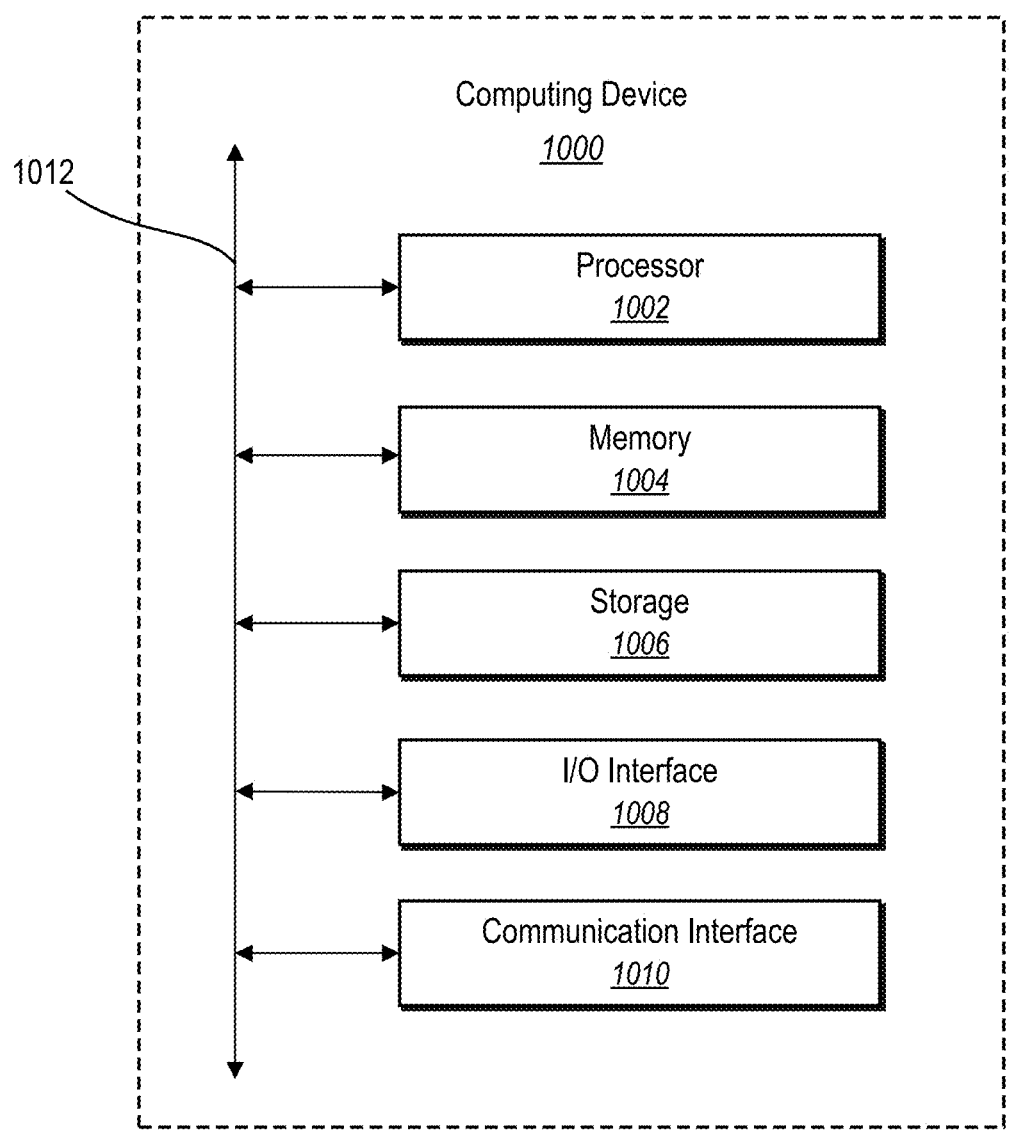
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the multi-RNN prediction system. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital media environment for distributing digital media, a computer-implemented method of utilizing recurrent neural networks to predict media consumption comprising:
    identifying a target audience for providing media via a distribution channel;
    identifying a plurality of historical media consumption sequences corresponding to a plurality of users of the target audience;
    generating, for the plurality of users, a plurality of individual media consumption predictions utilizing long short-term memory neural networks corresponding to the plurality of users based on a historical media consumption sequences corresponding to the plurality of users; and
    generating a media consumption prediction for the target audience by:
        combining the plurality of individual media consumption predictions for the plurality of users into a vector of combined values; and
        selecting the media consumption prediction for the target audience according to a highest value in the vector of combined values.

2. The computer-implemented method as recited in claim 1, further comprising:
    obtaining a ground truth consumption value for a first user corresponding to a time period for the media consumption prediction for the target audience, wherein the target audience comprises the first user;
    identifying a first long short-term memory neural network corresponding to the first user from the long short-term memory neural networks; and
    updating a state of the first long short-term memory neural network based on the ground truth consumption value.

3. The computer-implemented method as recited in claim 1, wherein the plurality of historical media consumption sequences corresponding to the plurality of users comprise, for each user of the plurality of users, a media consumption sequence indicating media content consumed by the user during a plurality of sequential time periods.

4. A non-transitory computer readable storage medium comprising instructions that, when executed by at least one processor, cause a computer system to:
    identify a plurality of historical media consumption sequences corresponding to a plurality of users;
    train a plurality of long short-term memory neural networks based on the historical media consumption sequences of the plurality of users;
    identify a subset of users from the plurality of users corresponding to a target audience and a subset of long short-term memory neural networks corresponding to the subset of users from the plurality of long short-term memory neural networks; and
    generate a media consumption prediction for the target audience utilizing the subset of long short-term memory neural networks by:
        generating, utilizing each long short-term memory neural network of the subset of long short-term memory neural networks, an individual media consumption prediction for a separate user of the subset of users;
        combining a plurality of individual media consumption predictions for the subset of users into a vector of combined values; and
        selecting the media consumption prediction for the target audience according to a highest value of the vector of combined values.

5. The non-transitory computer readable storage medium as recited in claim 4, further comprising instructions that, when executed by the at least one processor, cause the computer system to:
    obtain a ground truth consumption value for a first user corresponding to a time period for the media consumption prediction for the target audience, wherein the subset of users and the target audience comprise the first user;

identify a first long short-term memory neural network corresponding to the first user from the subset of long short-term memory neural networks; and
update a state of the first long short-term memory neural network corresponding to the first user based on the ground truth consumption value.

6. The non-transitory computer readable storage medium as recited in claim 5, further comprising instructions that, when executed by the at least one processor, cause the computer system to update the state of the first long short-term memory neural network based on the ground truth consumption value after a predetermined time period of a plurality of predetermined time periods prior to a training stage for the plurality of long short-term memory neural networks.

7. The non-transitory computer readable storage medium as recited in claim 4, further comprising instructions that, when executed by the at least one processor, cause the computer system to generate a plurality of media consumption predictions for the target audience for a plurality of sequential future time periods utilizing the subset of long short-term memory neural networks.

8. The non-transitory computer readable storage medium as recited in claim 4, wherein the instructions that cause the computer system to select the media consumption prediction for the target audience cause the computer system to select the highest value indicating a highest probability of members of the target audience consuming media content corresponding to the highest value.

9. The non-transitory computer readable storage medium as recited in claim 4, wherein:
the instructions that cause the computer system to identify the subset of users cause the computer system to identify users that have a characteristic corresponding to the target audience; and
the subset of long short-term memory neural networks corresponding to the subset of users comprise long short-term memory neural networks trained using historical media consumption sequences for the subset of users.

10. The non-transitory computer readable storage medium as recited in claim 4, further comprising instructions that, when executed by the at least one processor, cause the computer system to:
identify a second subset of users from the plurality of users corresponding to a second target audience and a second subset of long short-term memory neural networks corresponding to the second subset of users from the plurality of long short-term memory neural networks; and
generate a second media consumption prediction for the second target audience utilizing the second subset of long short-term memory neural networks.

11. The non-transitory computer readable storage medium as recited in claim 4, wherein the instructions that cause the computer system to train the plurality of long short-term memory neural networks cause the computer system to train each long short-term memory neural network of the plurality of long short-term memory neural networks based on a historical media consumption sequence for a unique user.

12. The non-transitory computer readable storage medium as recited in claim 4, wherein the instructions that cause the computer system to train the plurality of long short-term memory neural networks cause the computer system to train each long short-term memory neural network of the plurality of long short-term memory neural networks based on historical media consumption sequences for a unique group of users.

13. In a digital media environment for distributing digital media, a system for utilizing neural networks to predict media consumption comprising:
at least one processor; and
a non-transitory computer memory comprising:
a historical media consumption sequence for each user of a plurality of users; and
instructions that, when executed by the at least one processor, cause the system to generate a media consumption prediction for a target audience based on a plurality of recurrent neural networks by:
for each user of the plurality of users, generating a recurrent neural network corresponding to the user, the recurrent neural network being trained on the historical media consumption sequence of the user;
identifying a subset of users from the plurality of users corresponding to a target audience and a subset of recurrent neural networks corresponding to the subset of users from the plurality of recurrent neural networks;
generating, utilizing a recurrent neural network of the subset of recurrent neural networks, an individual media consumption prediction for a user of the subset of users; and
generating the media consumption prediction for the target audience by:
combining the individual media consumption prediction for the user with additional individual media consumption predictions for additional users of the subset of users into a vector of combined values; and
selecting the media consumption prediction for the target audience according to a highest value in the vector of combined values.

14. The system as recited in claim 13, further comprising instructions that, when executed by the at least one processor, cause the system to:
obtain ground truth consumption values for the subset of users corresponding to a time period for the media consumption prediction for the target audience; and
update states of the subset of recurrent neural networks based on the ground truth consumption values.

15. The system as recited in claim 13, further comprising instructions that, when executed by the at least one processor, cause the system to generate a plurality of media consumption predictions for the target audience for a plurality of sequential future time periods utilizing the subset of recurrent neural networks.

16. The system as recited in claim 13, wherein the instructions that cause the system to select the media consumption prediction for the target audience cause the system to select the highest value indicating a highest probability of members of the target audience consuming media content corresponding to the highest value.

17. The system as recited in claim 13, wherein:
the instructions that cause the system to identify the subset of users cause the system to identify users that have a characteristic corresponding to the target audience; and
the subset of recurrent neural networks corresponding to the subset of users comprise long short-term memory neural networks trained using historical media consumption sequences for the subset of users.

18. The system as recited in claim 13, further comprising instructions that, when executed by the at least one processor, cause the system to:
- identify a second subset of users from the plurality of users corresponding to a second target audience and a second subset of recurrent neural networks corresponding to the second subset of users from the plurality of recurrent neural networks; and
- generate a second media consumption prediction for the second target audience utilizing the second subset of recurrent neural networks.

19. The system as recited in claim 13, further comprising instructions that cause the system to train the plurality of recurrent neural networks by training each recurrent neural network of the plurality of recurrent neural networks based on a historical media consumption sequence for a separate individual user.

20. The system as recited in claim 13, further comprising instructions that cause the system to train the plurality of recurrent neural networks by training each recurrent neural network of the plurality of recurrent neural networks based on historical media consumption sequences for a separate group of users.

* * * * *